(12) United States Patent
Ford

(10) Patent No.: US 10,100,609 B2
(45) Date of Patent: *Oct. 16, 2018

(54) DUMP VALVE ASSEMBLY AND METHOD THEREFOR

(71) Applicant: Michael Brent Ford, St. George, UT (US)

(72) Inventor: Michael Brent Ford, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,058

(22) Filed: Mar. 2, 2017

(65) Prior Publication Data

US 2017/0175486 A1    Jun. 22, 2017

Related U.S. Application Data

(63) Continuation-in-part of application No. 14/811,210, filed on Jul. 28, 2015.

(51) Int. Cl.

| F04B 53/10 | (2006.01) |
|---|---|
| E21B 34/08 | (2006.01) |
| F04B 53/04 | (2006.01) |
| F16K 15/18 | (2006.01) |
| E21B 34/00 | (2006.01) |
| E21B 43/12 | (2006.01) |
| F04B 47/00 | (2006.01) |
| F04B 7/02 | (2006.01) |

(52) U.S. Cl.
CPC .............. *E21B 34/08* (2013.01); *F04B 53/04* (2013.01); *F04B 53/1002* (2013.01); *F16K 15/183* (2013.01); *E21B 43/121* (2013.01); *E21B 43/127* (2013.01); *E21B 2034/002* (2013.01); *F04B 7/02* (2013.01); *F04B 47/00* (2013.01)

(58) Field of Classification Search
CPC ...... F16K 15/183; E21B 43/127; E21B 34/08; F04B 53/1002; F04B 53/1007; F04B 53/1014; F04B 7/022; F04B 7/02
USPC .......................... 251/82; 417/555.2, 455, 554
See application file for complete search history.

(56) References Cited

U.S. PATENT DOCUMENTS

| 880,019 | A | * | 2/1908 | Futhey | .................... F04B 47/00 417/445 |
|---|---|---|---|---|---|
| 1,314,070 | A | * | 8/1919 | McKissick | .............. F04B 53/04 166/237 |
| 1,513,985 | A | * | 11/1924 | Gunn | ...................... F16K 15/04 137/533.13 |
| 1,518,865 | A | * | 12/1924 | McKissick | .............. E21B 34/00 166/318 |
| 1,543,179 | A | * | 6/1925 | Miller | ..................... F04B 53/04 166/334.3 |
| 1,576,597 | A | * | 3/1926 | Goss | ....................... F16K 15/02 166/331 |
| 1,652,542 | A | * | 12/1927 | Perry | .................. F04B 53/1002 137/533.13 |

(Continued)

*Primary Examiner* — Charles Freay
*Assistant Examiner* — Thomas Fink
(74) *Attorney, Agent, or Firm* — Weiss & Moy, P.C.; Veronica-Adele R. Cao; Karen J.S. Fouts

(57) ABSTRACT

A dump valve assembly is disclosed. The dump valve assembly has a seat plug that couples to a southern end of a traveling valve, a standing valve, and a ball. The seat plug has two prongs with angled bottom edges that engage two corresponding slots within the standing valve and that lift the ball off of the standing valve in order to open the standing valve for pump drainage.

20 Claims, 24 Drawing Sheets

(56) References Cited

U.S. PATENT DOCUMENTS

| | | | | |
|---|---|---|---|---|
| 1,660,486 A * | 2/1928 | Friend | F04B 53/04 | 166/334.3 |
| 1,717,497 A * | 6/1929 | Davis | E21B 31/18 | 251/291 |
| 2,252,767 A * | 8/1941 | Hudson | E21B 31/18 | 279/51 |
| 2,382,173 A * | 8/1945 | Renouf | F04B 53/00 | 294/86.1 |
| 2,459,003 A * | 1/1949 | Roark | F16K 15/00 | 137/375 |
| 2,649,328 A * | 8/1953 | Stevenson | E21B 34/06 | 294/86.1 |
| 2,682,281 A * | 6/1954 | Ecker | F16K 15/04 | 137/533.13 |
| 3,749,126 A * | 7/1973 | Addison | F16K 15/04 | 137/533.13 |
| 4,599,054 A * | 7/1986 | Spears | F04B 53/126 | 417/456 |
| 4,691,735 A * | 9/1987 | Horton | E21B 21/106 | 137/613 |
| 4,867,242 A * | 9/1989 | Hart | E21B 34/06 | 166/105 |
| 5,117,861 A * | 6/1992 | McConnell | F16K 15/04 | 137/515.7 |
| 5,249,936 A * | 10/1993 | McConnell | F16K 15/06 | 417/444 |
| 5,382,142 A * | 1/1995 | Spears | E21B 43/127 | 137/515 |
| 5,494,109 A * | 2/1996 | Schmitt | B01D 29/114 | 166/312 |
| 5,533,876 A * | 7/1996 | Nelson, II | E21B 31/107 | 137/512.3 |
| 5,941,311 A * | 8/1999 | Newton | E21B 43/127 | 166/105 |
| 5,992,452 A * | 11/1999 | Nelson, II | F04B 47/00 | 137/533.11 |
| 6,007,314 A * | 12/1999 | Nelson, II | F04B 47/02 | 137/533.15 |
| 6,659,741 B2 * | 12/2003 | Spears | F04B 47/02 | 417/555.2 |
| 9,518,457 B2 * | 12/2016 | Gronning | E21B 43/127 | |
| 2005/0129547 A1 * | 6/2005 | Burns | B08B 9/02 | 417/555.1 |
| 2005/0257927 A1 * | 11/2005 | Coyes | F04B 53/1007 | 166/108 |
| 2011/0061856 A1 * | 3/2011 | Kellner | E21B 23/02 | 166/193 |
| 2017/0058635 A1 * | 3/2017 | Downing | E21B 43/127 | |

\* cited by examiner

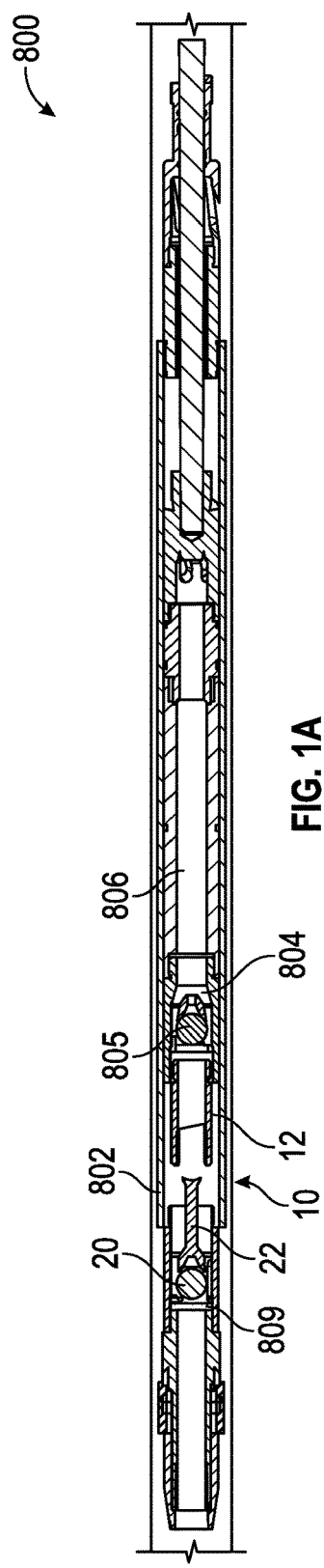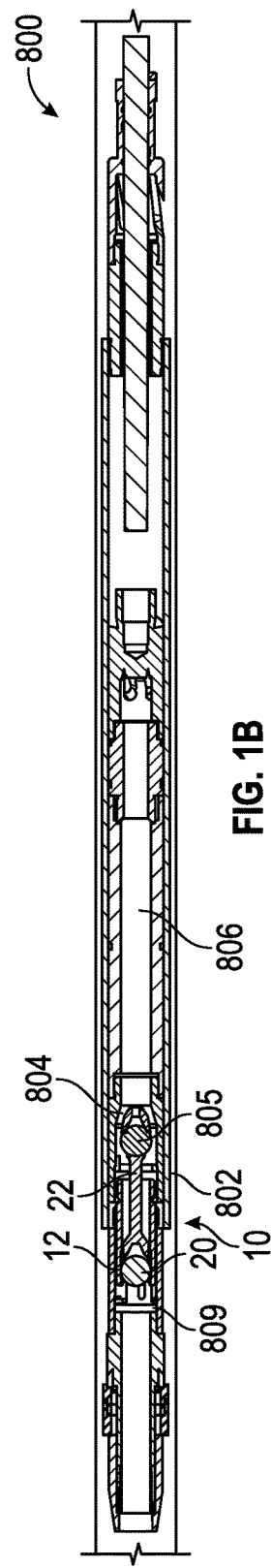

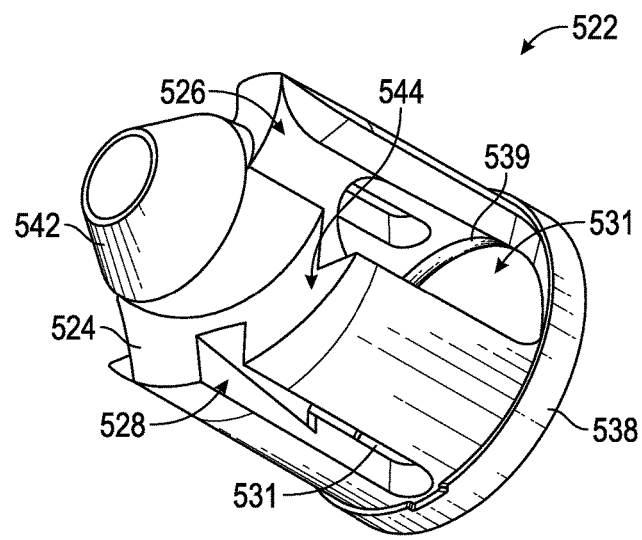
FIG. 31
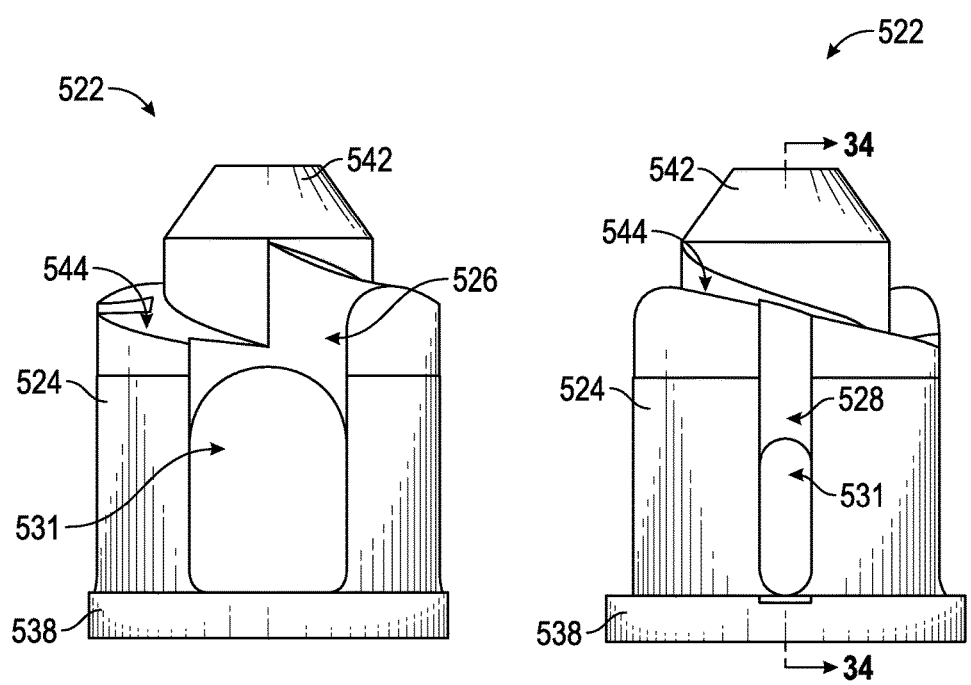
FIG. 32  FIG. 33

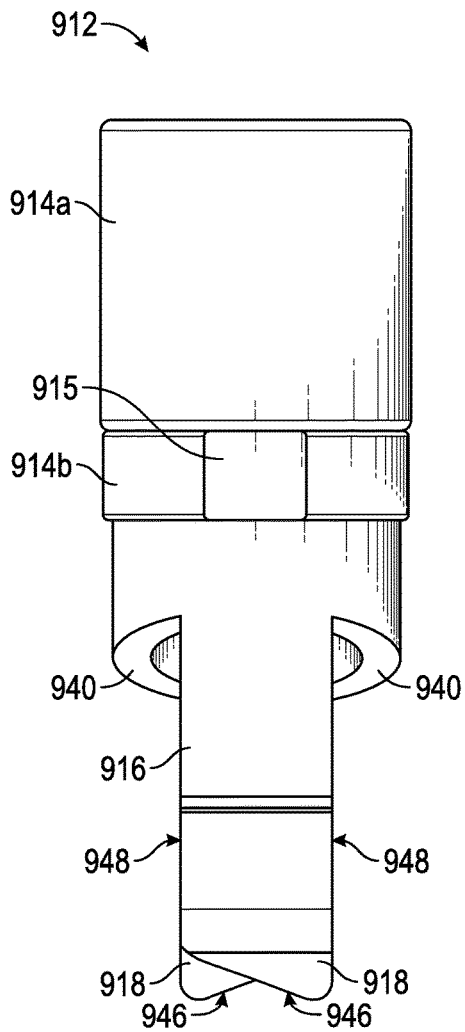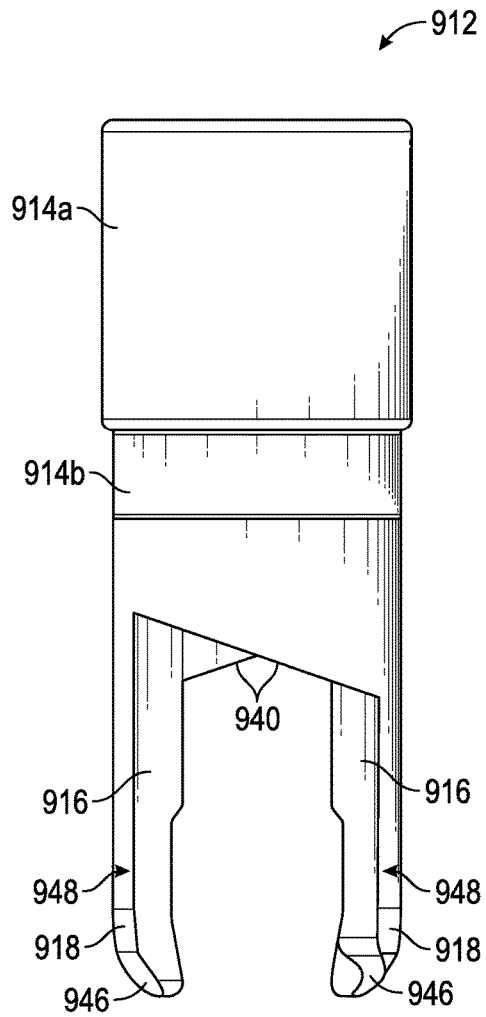
FIG. 42
FIG. 43

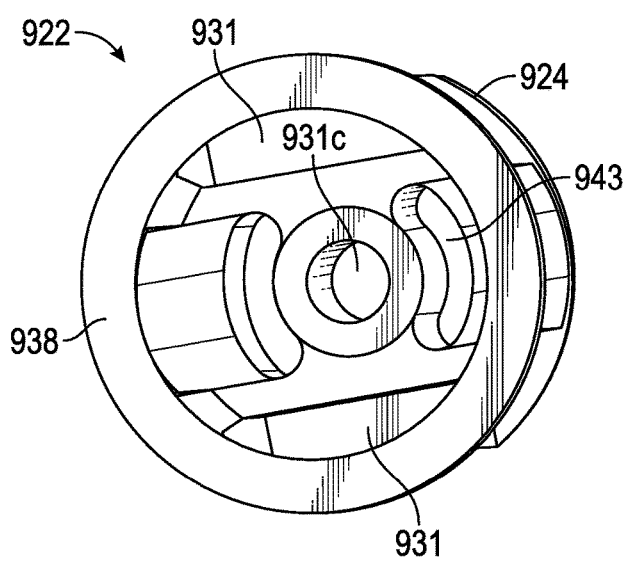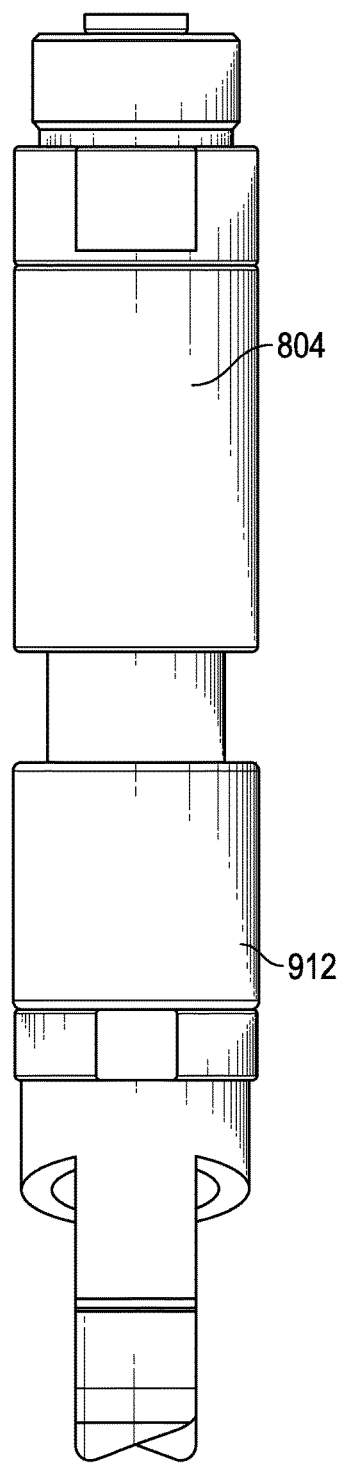
FIG. 48
FIG. 49

DUMP VALVE ASSEMBLY AND METHOD THEREFOR

CROSS-REFERENCE TO RELATED APPLICATION

This application is a continuation-in-part of and claims benefit to U.S. application Ser. No. 14/811,210 entitled "DUMP VALVE ASSEMBLY AND METHOD THEREFOR" which was filed on Jul. 28, 2015 in the name of the inventor herein and which is incorporated herein in full by reference.

FIELD OF THE INVENTION

The present invention generally relates to oil pumps and standing valves used, therein, and more specifically, to an improved dump valve assembly and related method therefor.

BACKGROUND OF THE INVENTION

In general terms, an oil well pumping system begins with an above-ground pumping unit, which creates the up and down pumping action that moves the oil (or other substance being pumped) out of the ground and into a flow line, from which the oil is taken to a storage tank or other such structure.

Below ground, a shaft is lined with piping know as "tubing." A sucker rod, which is ultimately, indirectly coupled at its north end to the pumping unit is inserted into the tubing. The sucker rod is coupled at its south end indirectly to the oil pump itself, which is also located within the tubing, which is sealed at its base to the tubing. The sucker rod couples to the oil pump at a coupling known as a 3-wing cage.

Beginning at the south end, oil pumps generally include a standing valve, which has a ball therein, the purpose of which is to regulate the passage of oil (or other substance being pumped) from downhole into the pump, allowing the pumped matter to be moved northward out of the system and into the flow line, while preventing the pumped matter from dropping back southward into the hole. Oil is permitted to pass through the standing valve and into the pump by the movement of the ball off of its seat, and oil is prevented from dropping back into the hole by the seating of the ball.

North of the standing valve, coupled to the sucker rod, is a traveling valve. The purpose of a conventional traveling valve is to regulate the passage of oil from within the pump northward in the direction of the flow line, while preventing the pumped oil from slipping back down in the direction of the standing valve and hole.

In use, oil is pumped from a hole through a series of "downstrokes" and "upstrokes" of the oil pump, wherein these motions are imparted by the above-ground pumping unit. During the upstroke, formation pressure causes the ball in the standing valve to move upward, allowing the oil to pass through the standing valve and into the barrel of the oil pump. This oil will be held in place between the standing valve and the traveling valve. In the conventional traveling valve, the ball is located in the seated position. It is held there by the pressure from the oil that has been previously pumped. The oil located above the traveling valve is moved northward in the direction of the 3-wing cage at the end of the oil pump.

During the downstroke, the ball in the conventional traveling valve unseats, permitting the oil that has passed through the standing valve to pass therethrough. Also during the downstroke, the ball in the standing valve seats, preventing the pumped oil from slipping back down into the hole.

The process repeats itself again and again, with oil essentially being moved in stages from the hole, to above the standing valve and in the oil pump, to above the travelling valve and out of the oil pump. As the oil pump fills, the oil passes through the 3-wing cage and into the tubing. As the tubing is filled, the oil passes into the flow line, from which the oil is taken to a storage tank or other such structure.

In some oil production processes, it may be desirable to pump steam, chemical, or hot oil from the surface down the pump tubing and into the formation. In order to do this, the ball in the standing valve must be unseated so that pumped fluid may be drained back down through the standing valve into the formation. One type of pumping system that is currently used may have a duck bill valve to move the ball to the side and off of the seat of the standing valve, which requires that the standing valve be large enough for the ball to move sideways. Having a large standing valve, however, allows for the ball to move around too much, which eventually causes much wear to the interior of the standing valve.

The present invention addresses this problem encountered in the prior art pumping systems, by minimizing pump damage caused by wear to the interior of the standing valve.

SUMMARY

In accordance with one embodiment, a dump valve assembly for use with a pump system is disclosed. The dump valve assembly comprises: a seat plug adapted to be coupled to a southern end of a traveling valve, the seat plug having two prongs; a standing valve having a body portion and an annular base, wherein the body portion comprises: two slots adapted to receive the two prongs; at least one channel; and at least one port for allowing pumped fluid to pass therethrough; and a ball that is adapted to be lifted by the two prongs in order to open the standing valve.

In accordance with another embodiment of a dump valve assembly for use with a pump system is disclosed. The dump valve assembly comprises: a seat plug, the seat plug comprising: a body adapted to be coupled to a southern end of a traveling valve; and at least two prongs extending downwardly from the body of the seat plug; a standing valve having a body portion and an annular base, wherein the body portion comprises: at least two slots adapted to receive the at least two prongs; at least two channels, wherein the at least two channels are positioned opposite from each other and wherein each channel is positioned between two of the at least two slots; and at least four ports located proximate a southern end of the body portion, wherein one port is formed within each slot and each channel and wherein the ports allow pumped fluid to pass upwardly therethrough during an upstroke of pump system and also downwardly during a draining of the pump system; and a ball that is adapted to be lifted by the at least two prongs in order to open the standing valve during the draining of the pump system.

In accordance with another embodiment a method for draining a pump system is disclosed. The method comprises the steps of: providing a dump valve assembly, wherein the dump valve assembly comprises: a seat plug adapted to be coupled to a southern end of a traveling valve, the seat plug having two prongs; a standing valve having a body portion and an annular base, wherein the body portion comprises; two slots adapted to receive the two prongs; two channels, wherein the channels are positioned opposite from each other and wherein each channel is positioned between the two slots; and four ports located proximate a southern end of the body portion, wherein one port is formed within each slot and each channel and wherein the ports allow pumped fluid to pass upwardly therethrough during an upstroke of pump system and also downwardly during a draining of the pump system; and a ball positioned within the standing valve; pressing the traveling valve downwardly; inserting the two prongs of the seat plug into the two slots of the standing valve; capturing the ball between the two prongs; lifting the traveling valve upwardly in order to unseat the ball and to open the standing valve; and draining pumped fluid downwardly through the ports within the body portion of the standing valve.

In accordance with another embodiment of the present invention, a dump valve assembly for use with a pump system is disclosed. The dump valve assembly comprises: a seat plug adapted to be coupled to a southern end of a traveling valve, the seat plug having two prongs, each prong having an angled bottom edge; a standing valve having a body portion and an annular base, wherein the body portion comprises; two slots adapted to receive the two prongs; and at least one port for allowing pumped fluid to pass therethrough; and a ball that is adapted to be lifted by the two prongs in order to open the standing valve.

In accordance with another embodiment of the present invention, a dump valve assembly for use with a pump system is disclosed. The dump valve assembly comprises: a seat plug, the seat plug comprising: a body adapted to be coupled to a southern end of a traveling valve; and at least two prongs extending downwardly from the body of the seat plug, and each prong having an angled bottom edge; a standing valve having a body portion and an annular base, wherein the body portion comprises: at least two slots adapted to receive the at least two prongs; and at least four ports located proximate a southern end of the body portion, wherein each slot has a port formed therein and wherein the ports allow pumped fluid to pass upwardly therethrough during an upstroke of pump system and also downwardly during a draining of the pump system; a center port formed at a center of the northern end of an interior of the body portion; and two ports formed at the northern end of the interior of the body portion, wherein the two ports are located opposite from one another and wherein the center port is positioned between them; and a ball that is adapted to be lifted by the at least two prongs in order to open the standing valve during the draining of the pump system.

In accordance with another embodiment of the present invention, a method for draining a pump system is disclosed. The method comprises the steps of: providing a dump valve assembly, wherein the dump valve assembly comprises: a seat plug adapted to be coupled to a southern end of a traveling valve, the seat plug having two prongs, each prong having an angled bottom edge; a standing valve having a body portion and an annular base, wherein the body portion comprises; two slots adapted to receive the two prongs; and four ports located proximate a southern end of the body portion, wherein each slot has a port formed therein and wherein the ports allow pumped fluid to pass upwardly therethrough during an upstroke of pump system and also downwardly during a draining of the pump system; and a ball positioned within the standing valve; pressing the traveling valve downwardly; inserting the two prongs of the seat plug into the two slots of the standing valve; capturing the ball between the two prongs; lifting the traveling valve upwardly in order to unseat the ball and to open the standing valve; and draining pumped fluid downwardly through the ports within the body portion of the standing valve.

BRIEF DESCRIPTION OF THE DRAWINGS

The present application is further detailed with respect to the following drawings. These figures are not intended to limit the scope of the present application, but rather, illustrate certain attributes thereof.

FIG. 1A is a side cross-sectional view of a dump valve assembly, in accordance with one or more aspects of the present invention shown in use within a pump barrel during regular pumping operations;

FIG. 1B is a side cross sectional view of the dump valve assembly of FIG. 1 shown in use within a pump barrel during the draining process;

FIG. 31 is a perspective view of another embodiment of the standing valve of another embodiment of the dump valve assembly, in accordance with one or more aspects of the present invention;

FIG. 32 is a side view of the standing valve of FIG. 31;

FIG. 33 is an alternate side view of the standing valve of FIG. 31;

FIG. 42 is a side view of another embodiment of the seat plug of another embodiment of the dump valve assembly, in accordance with one or more aspects of the present invention;

FIG. 43 is an alternate side view of the seat plug of FIG. 42;

FIG. 48 is a bottom perspective view of the standing valve of FIG. 46; and

FIG. 49 is a side view of the seat plug of FIG. 42 coupled to a southern end of a traveling valve.

DETAILED DESCRIPTION OF THE INVENTION

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

Figure 2:
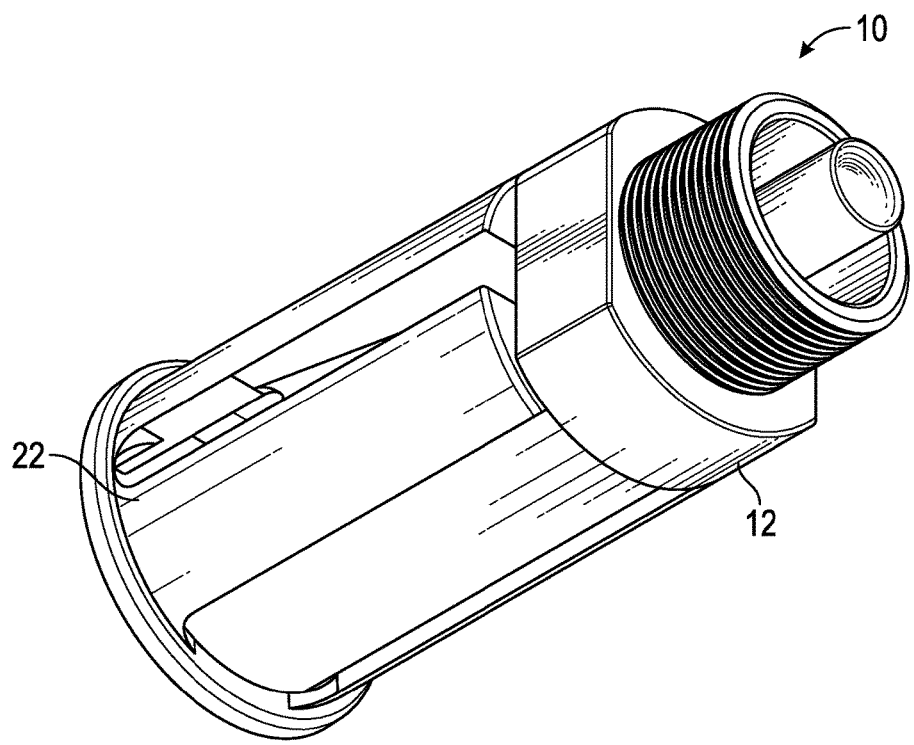
FIG. 2 is a perspective view of a dump valve assembly, in accordance with one or more aspects of the present invention.

FIGS. 1A-49, together, disclose an embodiment of a dump valve assembly 10 of the present invention. As shown in FIGS. 1A-2, the dump valve assembly 10 is adapted to be used with a pump system 800 and is positioned within the pump barrel 802. The dump valve assembly 10 of the present invention may have a seat plug 12, a ball 20, and a standing valve 22. The seat plug 12 is adapted to removably couple with the standing valve 22. For example, in FIG. 1A, the pump is shown during regular pumping operations, wherein the seat plug 12 is shown positioned above the standing valve 22; the seat plug 12 is not yet engaging the standing valve 22. Then, in FIG. 1B, the pump is shown during the draining process, wherein the seat plug 12 is shown engaging the standing valve 22 and the ball 20 of the standing valve 22 is shown as being held by the seat plug 12 and lifted off of the seat 809 that is below the standing valve 22. The standing valve 22 of the present invention may be used in lieu of a conventional standing valve and the seat plug 12 of the present invention may be coupled to a southern end of a conventional traveling valve 804. Alternatively, the seat plug 12 may be coupled to the southern end of an anti-gas valve such as the valve described in U.S. Pat. No. 6,481,987 or the valve described in U.S. Pat. No. 7,878,767, both of which were issued to the same inventor herein and are incorporated herein by reference.

Figure 3:
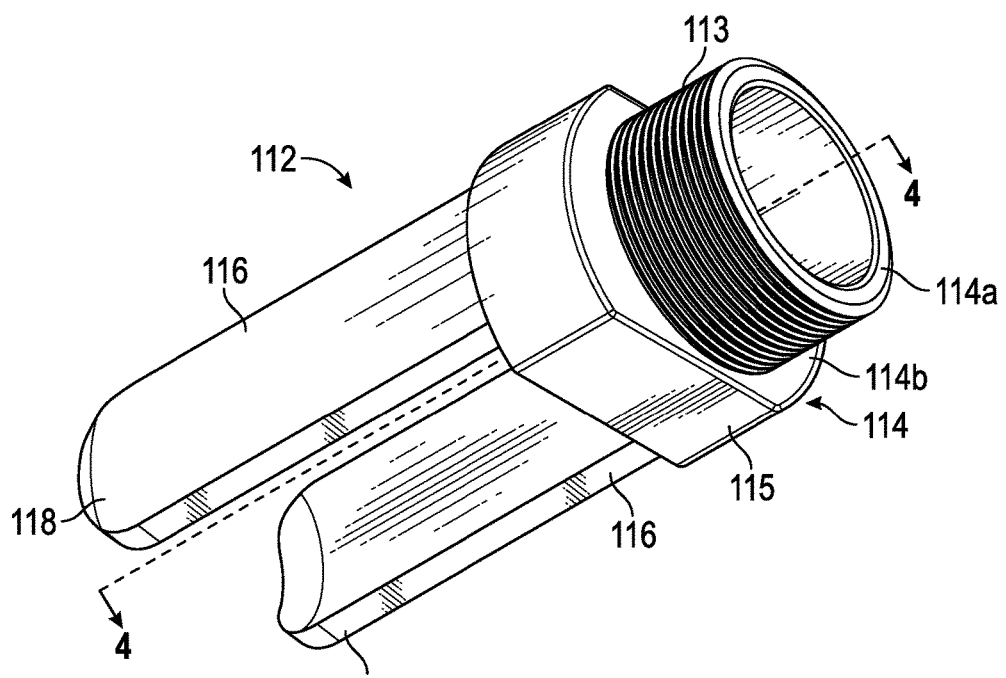
FIG. 3 is a perspective view of one embodiment of a seat plug of the dump valve assembly of FIG. 2, in accordance with one or more aspects of the present invention.
Figure 4:
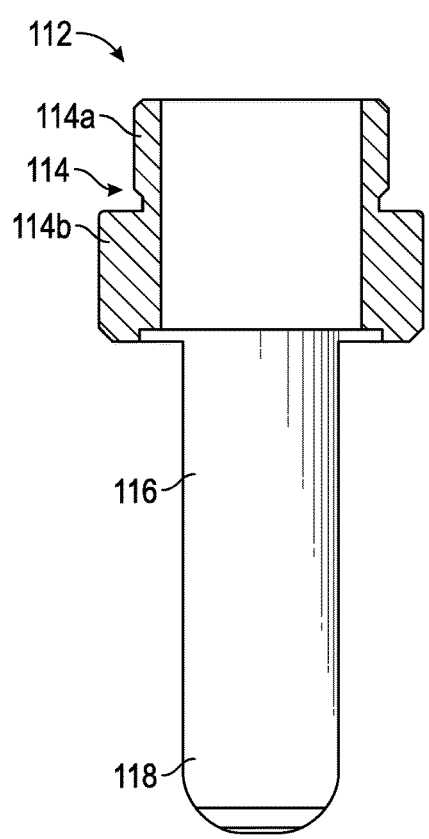
FIG. 4 is a side cross-sectional view of the seat plug of FIG. 3.
Figure 5:
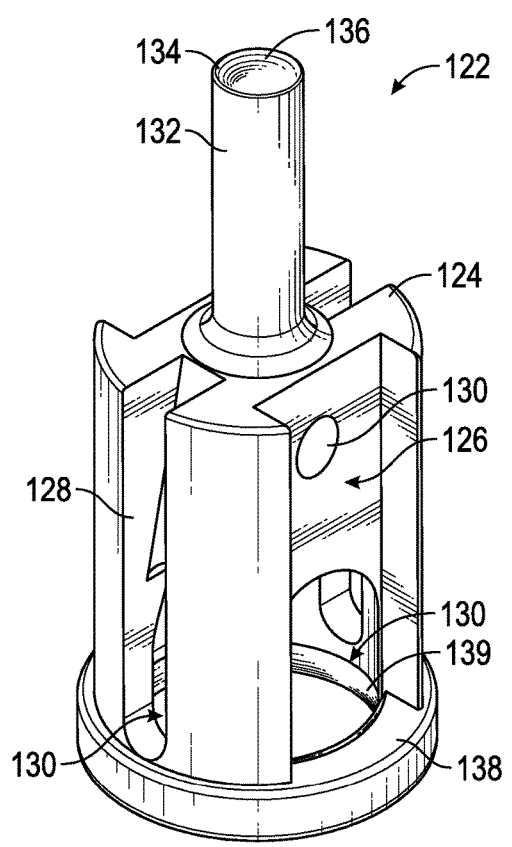
FIG. 5 is a perspective view of one embodiment of a standing valve of the dump valve assembly of FIG. 2, in accordance with one or more aspects of the present invention.
Figure 6:
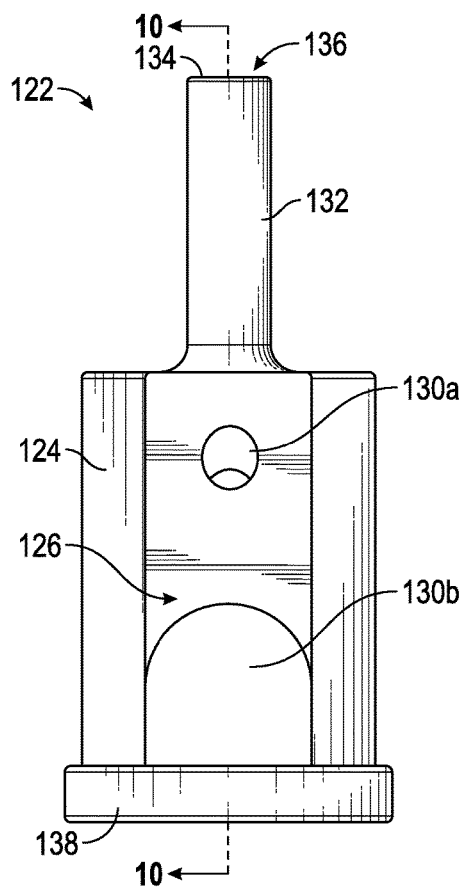
FIG. 6 is a side view of the standing valve of FIG. 5.
Figure 7:
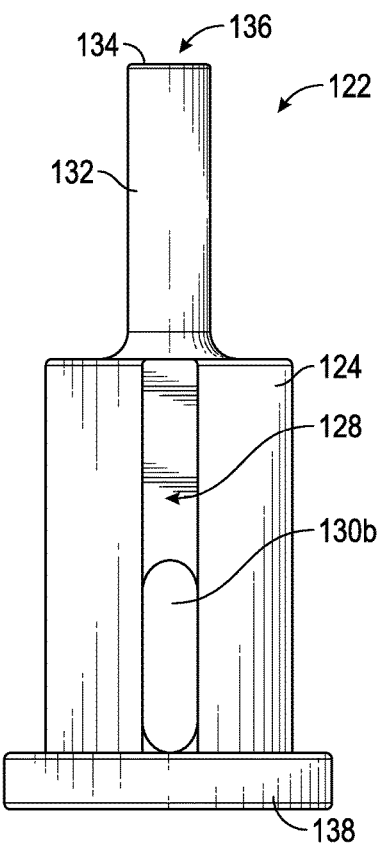
FIG. 7 is an alternate side view of the standing valve of FIG. 5.
Figure 8:
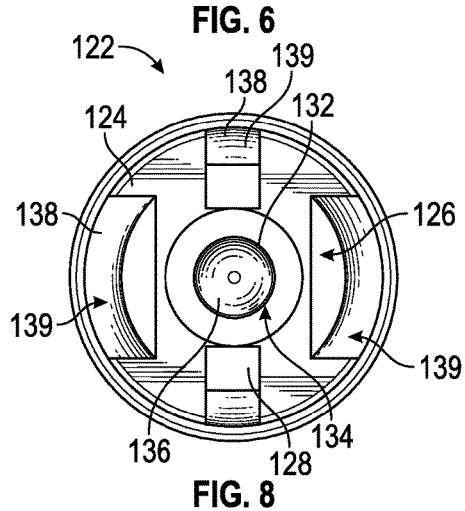
FIG. 8 is a top view of the standing valve of FIG. 5.
Figure 9:
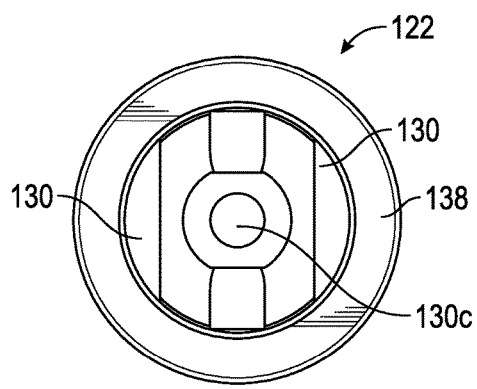
FIG. 9 is a bottom view of the standing valve of FIG. 5.
Figure 10:
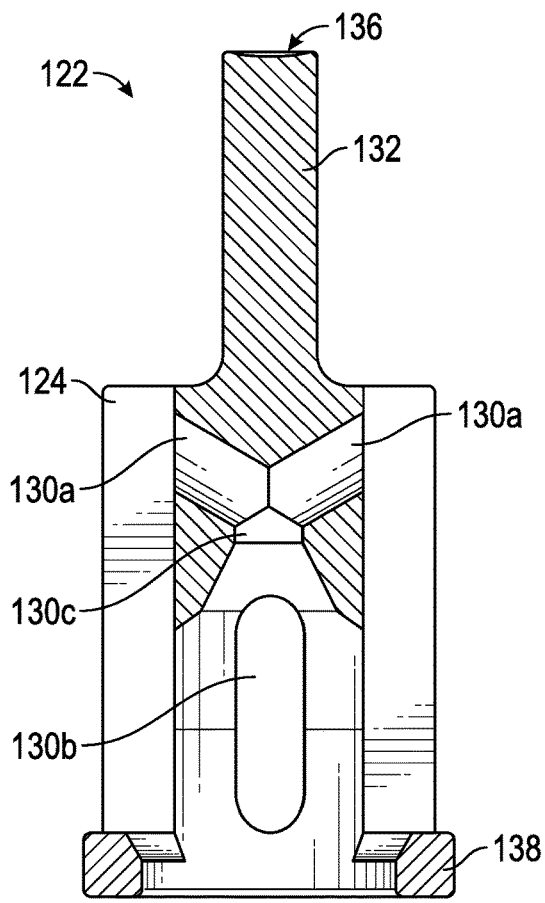
FIG. 10 is a side cross-sectional view of the standing valve of FIG. 5.
Figure 11:
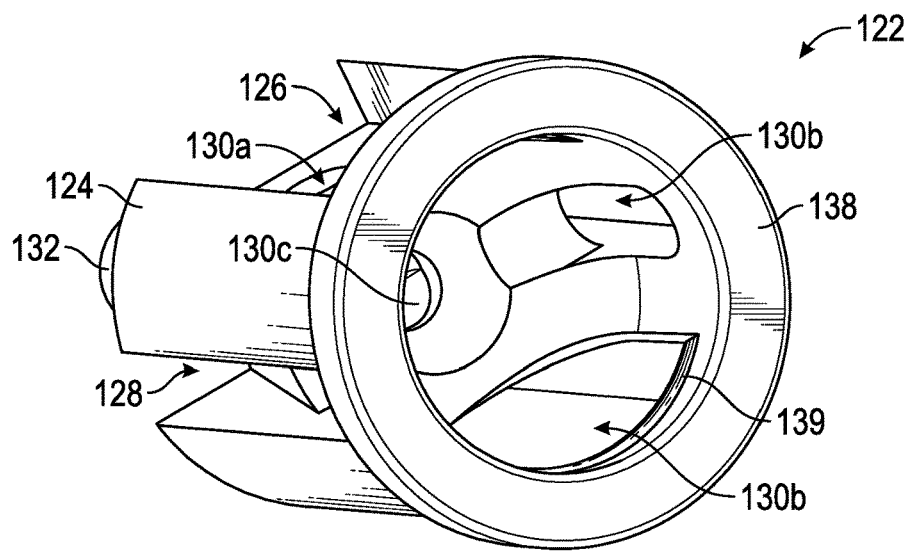
FIG. 11 is a bottom perspective view of the standing valve of FIG. 5.
Figure 12:
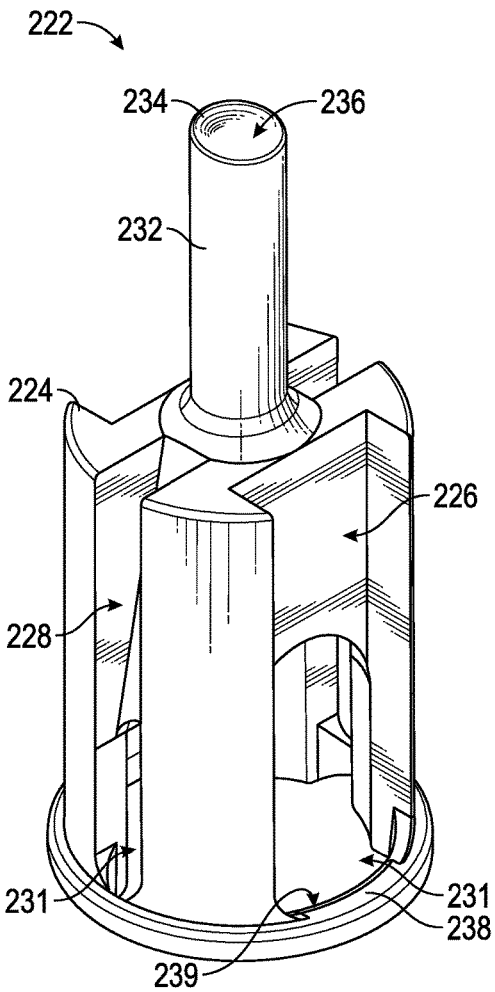
FIG. 12 is a perspective view of another embodiment of the standing valve of the dump valve assembly of FIG. 2, in accordance with one or more aspects of the present invention.
Figure 13:
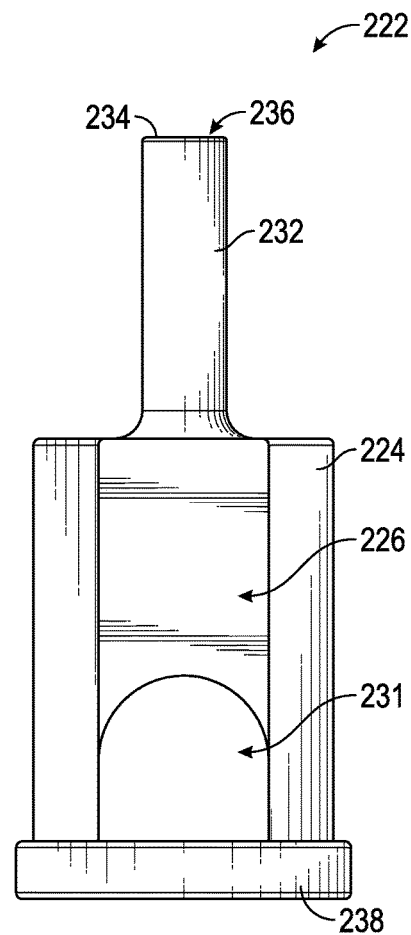
FIG. 13 is a side view of the standing valve of FIG. 12.
Figure 14:
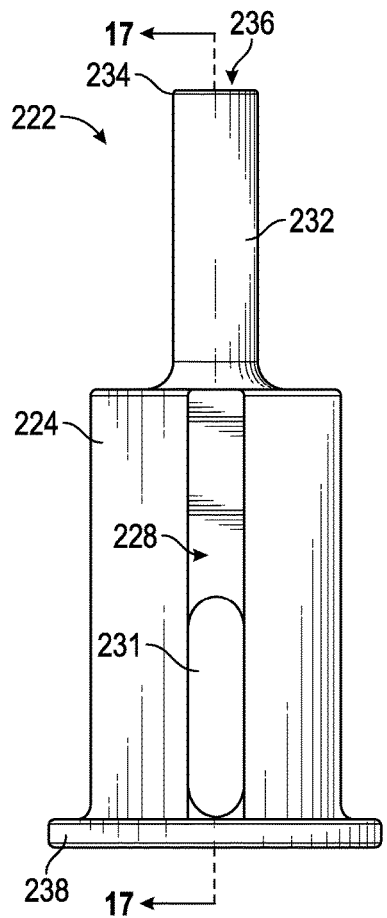
FIG. 14 is an alternate side view of the standing valve of FIG. 12.
Figure 15:
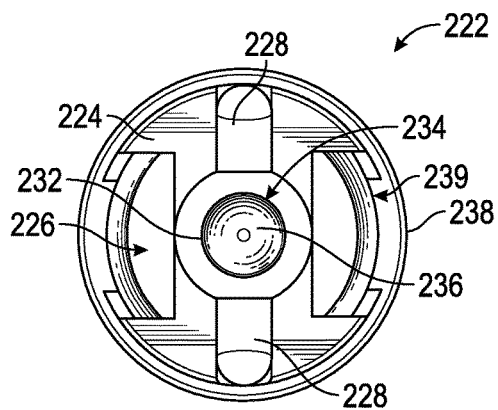
FIG. 15 is a top view of the standing valve of FIG. 12.
Figure 16:
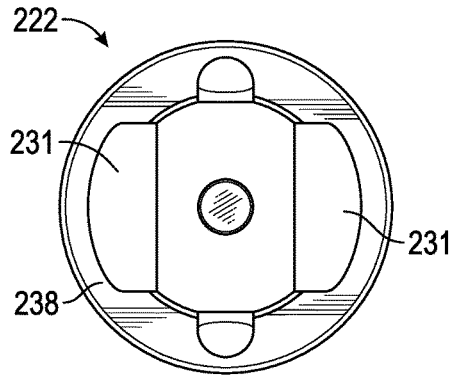
FIG. 16 is a bottom view of the standing valve of FIG. 12.
Figure 17:
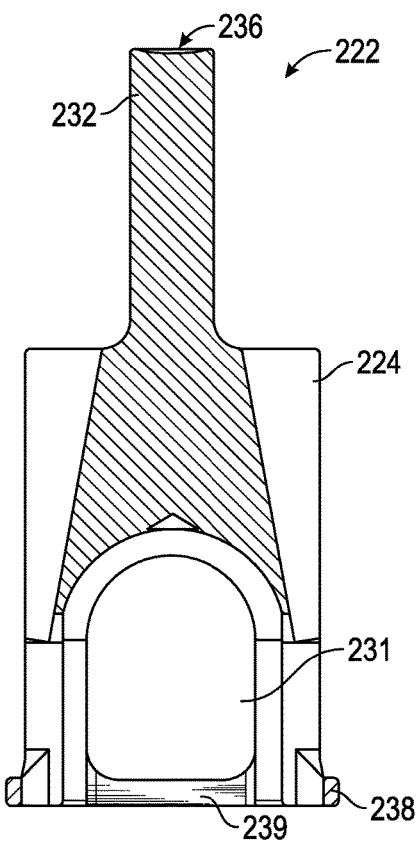
FIG. 17 is a side cross-sectional view of the standing valve of FIG. 12.

FIGS. 3-4 show one embodiment of the seat plug 112 (referred to generically as seat plug 12). This seat plug 112 may be adapted to mate with the embodiments of the standing valve 122, 222 shown in FIGS. 5-17 (discussed below). The seat plug 112 may have a cylindrical body 114 with a channel formed therethrough. The body 114 may have a first section 114a and a second section 114b, wherein the first section 114a has a smaller outer diameter than the second section 114b. The first section 114a may have threading 113 in order to couple it to the threaded southern end of the traveling valve 804. The second section 114b may also have wrench flats 115 formed on its outer surface. The body 114 may have two prongs 116 positioned opposite from each other and extending downwardly from a southern end of the body 114. It should be clearly understood, however, that any number of prongs 116 may be used. In one embodiment, the prongs 116 may be positioned parallel to each other and may extend downwardly and perpendicularly from the southern end of the body 114. Alternatively, the prongs 116 may be slightly angled so that the southern ends of the prongs 116 are closer together than the northern ends of the prongs 116. In other words, the distance between the northern ends of the two prongs 116 may be equal to or slightly greater than the diameter of the ball 20 while the distance between the southern ends of the two prongs 116 may be smaller than the diameter of the ball 20. For example, if the ball 20 has a diameter of 2.5 inches, then the space between the inner surfaces of the northern ends of the two prongs 116 may also be 2.5 inches or it may be 2.5 inches plus between 0.015-0.020 inches while the space between the inner surfaces of the southern ends of the two prongs 116 may be 2.5 inches minus between 0.015-0.020 inches. Of course, the distance between the two prongs 116 depends upon the size of the ball 20 within the standing valve 122, 222 that the seat plug 112 is mating with. Each of the prongs 116 may be curved on their inner surfaces in order to correspond to the curvature of the ball 20 that is housed within the standing valve 122, 222.

The prongs 116 of the seat plug 112 may each have a tapered distal end 118. The tapered distal ends 118 may each be concavely curved on its inner surface so that the space between the inner surfaces of the tapered distal ends 118 is slightly greater than the space between the inner surfaces of the prongs 116 in the area above the tapered distal ends 118. The space between the inner surfaces of the tapered distal ends 118, however, may still be smaller than the diameter of the ball 20. In furtherance of the example above, if the space between the inner surfaces of the southern ends of the two prongs 116 above the tapered distal ends 118 is 2.5 inches minus between 0.015-0.020 inches, then the space between the inner surfaces of the two tapered distal ends 118 of the prongs 116 may be approximately ¹⁄₁₆ inch greater. This allows the tapered distal ends 118 of the prongs 116 to fit around a top portion of the ball 20, which helps to guide the ball 20 into the space between the prongs 116 as the seat plug 112 is pushed downwardly onto the ball 20 during the drainage process. Each of the tapered distal ends 118 of the prongs 116 may also be convexly curved on its outer surface in order to correspond to a concavely curved inner surface 139, 239 of the base 138, 238 of the standing valve 122, 222 (discussed and shown in FIG. 8 and FIG. 15 below).

FIGS. 5-11 show one embodiment of the standing valve 122 (referred to generically as standing valve 22) of the present invention. The standing valve 122 may have a body portion 124, a stem 132 coupled to and extending upwardly from a northern end of the body portion 124, and an annular base 138 coupled to the southern end of the body portion 124. The body portion 124 of the standing valve 122 may have two opposing slots 126 (see FIG. 6) formed along the entire length of the body portion 124. The two opposing slots 126 are dimensioned to receive the two prongs 116 of the seat plug 112; i.e. the two prongs 116 of the seat plug 112 may slide downwardly into the two slots 126 and may slide upwardly out of the two slots 126. The number of slots 126 may equal the number of prongs 116 of the corresponding seat plug 112. The body portion 124 may also have two opposing channels 128 (see FIG. 7) formed along the entire length of the body portion 124. Each channel 128 is positioned between the two slots 126 (see FIG. 8). As shown, the channels 128 may be narrower in width than the slots 126. If there are more than two slots 126, then there may be more than two channels 128, wherein each channel 128 is positioned between two of the slots 126.

The body portion 124 of the standing valve 122 may also have a plurality of ports 130. In this embodiment, the body portion 124 may have two top ports 130a (referred to generically as ports 130) located proximate a northern end of the body portion 124 and may have four bottom ports 130b located proximate a southern end of the body portion 124. Each slot 126 may have one top port 130a and one bottom port 130b (see FIG. 6). However, each channel 128 may have only one bottom port 130b and may not have a top port 130a (see FIG. 7). The bottom ports 130b (referred to generically as ports 130) are formed within the slots 126 and the channels 128 and lead to the interior of the body portion 124 of the standing valve 122. The bottom ports 130b located within the slots 126 may be in the shape of a half-oval or an inverted U (see FIG. 6) while the bottom ports 130b located within the channels 128 may be in the shape of a complete oval (see FIG. 7). The top ports 130a are formed only within the slots 126 and may have a circular shape (see FIG. 6). Like the bottom ports 130b, the top ports 130a also lead to the interior of body portion 124 of the standing valve 122 (see FIG. 10). The top ports 130a may meet at a center port 130c, which is located within the interior of the body portion 124 and positioned at a center of the northern end of the body portion 124 (see FIG. 10 and FIG. 11).

During an upstroke of the pump assembly 806, formation pressure causes the ball 20 within the standing valve 122 to unseat and move upward, allowing the pumped fluid (e.g. oil) to pass through the standing valve 122 and up into the pump barrel 802 of the pump system 800. The pumped fluid may pass through the annular base 138 of the standing valve 122, into interior of the body portion 124, and around the unseated ball 20. The pumped fluid may then exit the body portion 124 by flowing out of the ports 130. Pumped fluid may travel around the lower part of the unseated ball 20 and may exit the body portion 124 through the bottom ports 130b. Pumped fluid may also travel around the upper part of the unseated ball 20 and may exit the body portion 124 through the center port 130c and subsequently through the top ports 130a. This flow of the pumped fluid creates a hydraulic cushion around the unseated ball 20 within the interior of the body portion 124 which prevents the unseated ball 20 from moving too much within the interior of the body portion 124, thereby minimizing wear and tear of the standing valve 122.

After the pumping operations have ceased, the ball 20 will fall back down and seat itself, thereby closing the standing valve 122. If it is desired to drain the pump tubing, the ball 20 within the standing valve 122 must be moved in order to open the standing valve 122 and allow the drainage to occur. The prongs 116 of the seat plug 112 may be lowered and slid into the corresponding slots 126 of the standing valve 122. The inner surfaces of the tapered distal ends 118 of the prongs 116 will then begin to engage the top portion of the ball 20. As mentioned above, the base 138 of the standing valve 122 may have a concavely curved inner surface 139 (see FIGS. 8 and 11) that is dimensioned to correspond with the convexly curved outer surface of the tapered distal ends 118 of the prongs 116. The entire inner surface 139 of the base 138 of the standing valve 122 may be concavely curved, or substantial benefit may still be derived if only some portions of the inner surface 139 of the base 138 were curved (particularly, the areas of the base 138 that are directly beneath the slots 126). Thus, as the seat plug 112 is pushed downwardly, the prongs 116 of the seat plug 112 will slightly spread apart as the ball 20 is pushed between the two prongs 116. As the seat plug 112 continues to push downwardly, the curved inner surface of the base 138 of the standing valve 122 will engage the outer surfaces of the tapered distal ends 118 of the prongs 116 and push the prongs 116 inwardly back toward each other, thereby causing the ball 20 to be lifted and to be held between the two prongs 116. With the ball 20 lifted and held between the two prongs 116, the fluid that is to be drained may pass downwardly through the channel of the body 114 of the seat plug 112, through the channels 128, through the bottom ports 130b of the channels 128, into the interior of the body portion 124, around and underneath the ball 20, through the base 138 of the standing valve 122 and back down into the well formation. There may be some fluid that passes downwardly through the slots 126 and through the bottom ports 130b of the slots 126, but the majority of the fluid will drain through the bottom ports 130b of the channels 128, rather than the bottom ports 130b of the slots 126.

The stem 132 of the standing valve 122 may have an annular ridge 134 formed on its northern end, wherein the top surface 136 of the northern end of the stem 132 is slightly concave. The curvature of the top surface 136 of the northern end of the stem 132 may correspond to the curvature of the ball 805 (see FIGS. 1A-1B) of the traveling valve 804. This allows for more surface area of the top surface 136 of the stem 132 to come in contact with the ball 805 of the traveling valve 804, thereby causing less damage to the ball 805 of the traveling valve 804. When the traveling valve 804 is lowered, the prongs 116 of the seat plug 112 slide into the slots 126 of the standing valve 122, and the stem 132 will contact the ball 805 of the traveling valve 804 and push it up off of its seat, thereby opening the traveling valve 804 and allowing pumped fluid to flow downwardly from the pump tubing, down through the traveling valve 804, through the standing valve 122, and down into the well formation.

In one embodiment of the present invention, the stem 132 may have a channel formed therethrough. This channel would allow for more flow area through the body portion 124 of the standing valve 122. This additional flow area may help to reduce the movement of the ball 20 within the interior of the body portion 124, thus lessening the wear and tear of the standing valve 122.

FIGS. 12-17 show another embodiment of the standing valve 222 (referred to generically as standing valve 22) of the present invention. The standing valve 222 may have a body portion 224, a stem 232 coupled to and extending upwardly from a northern end of the body portion 224, and an annular base 238 coupled to the southern end of the body portion 224. The body portion 224 of the standing valve 222 may have two opposing slots 226 (see FIG. 13) formed along the entire length of the body portion 224. The two opposing slots 226 are also dimensioned to receive the two prongs 116 of the seat plug 112; i.e. the two prongs 116 of the seat plug 112 may slide downwardly into the two slots 226 and may slide upwardly out of the two slots 226. The number of slots 226 may equal the number of prongs 116 of the corresponding seat plug 112. The body portion 224 may also have two opposing channels 228 (see FIG. 14) formed along the entire length of the body portion 224. Each channel 228 is positioned between the two slots 226 (see FIG. 15). As shown, the channels 228 may be narrower in width than the slots 226. If there are more than two slots 226, then there may be more than two channels 228, wherein each channel 228 is positioned between two of the slots 226.

In this embodiment, the standing valve 222 may have four ports 231 located proximate the southern end of the body portion 224. Each slot 226 has one port 231 (see FIG. 13) formed therein and each channel 228 has one port 231 formed therein (see FIG. 14). The ports 231 are formed within the slots 226 and the channels 228 and all lead to the interior of the body portion 224 of the standing valve 222. The ports 231 located within the slots 226 may be in the shape of a half-oval or an inverted U (see FIG. 13); while the ports 231 located within the channels 228 may be in the shape of a complete oval (see FIG. 14).

In this embodiment, the ports 231 located within the channels 228 extend along a greater portion of the length of the channels 228 than the bottom ports 130*b* within the channels 128 shown in the embodiment of the standing valve 122 of FIGS. 5-11 do. The length of each of the channels 228 may be greater than the diameter of the ball 20. For example, the ports 231 within the channels 228 may be approximately 0.5 inch longer than the bottom ports 130*b* within the channels 128 shown in the embodiment of the standing valve 122 of FIGS. 5-11. These longer ports 231 within the channels 228 are needed because there are no top ports 130*a* in this embodiment of the standing valve 222.

During the upstroke of the pump assembly 806, formation pressure causes the ball 20 within the standing valve 222 to unseat and move upward, allowing the pumped fluid (e.g. oil) to pass through the standing valve 222 and up into the pump barrel 802 of the pump system 800. With this embodiment, the pumped fluid may pass through the annular base 238 of the standing valve 222, into interior of the body portion 224, and around the unseated ball 20. The pumped fluid may then exit the body portion 224 by flowing out of the ports 231. Pumped fluid may travel around the lower part of the unseated ball 20 and may exit the body portion 224 through the ports 231 formed within the slots 226 and through a bottom portion of the ports 231 formed within the channels 228. Pumped fluid may also travel around the upper part of the unseated ball 20 and may exit the body portion 224 through a top portion of the ports 231 formed within the channels 228. This configuration (i.e. the standing valve 222 having longer ports 231 within the channels 228 instead of the standing valve 122 having the combination of a top port 130*a* and a short bottom port 130*b* within the channels 128) also allows the flow of the pumped fluid to create a hydraulic cushion around the unseated ball 20 within the interior of the body portion 224 which prevents the unseated ball 20 from moving too much within the interior of the body portion 224, thereby minimizing wear and tear of the standing valve 222.

After the pumping operations have ceased, the ball 20 will fall back down and seat itself, thereby closing the standing valve 222. If it is desired to drain the pump tubing, the ball 20 within the standing valve 222 must be moved in order to open the standing valve 222 and allow the drainage to occur. The prongs 116 of the seat plug 112 may be lowered and slid into the corresponding slots 226 of the standing valve 222. The inner surfaces of the tapered distal ends 118 of the prongs 116 will then begin to engage the top portion of the ball 20. The base 238 of the standing valve 222 may also have a curved inner surface 239 (see FIG. 15) that is dimensioned to correspond with the outer surface of the tapered distal ends 118 of the prongs 116 of the seat plug 112. The entire inner surface 239 of the base 238 of the standing valve 222 may be curved, or substantial benefit may still be derived if only some portions of the inner surface 239 of the base 238 were curved (particularly, the areas of the base 238 that are directly beneath the slots 226). Thus, as the seat plug 112 is pushed downwardly, the prongs 116 will slightly spread apart as the ball 20 is pushed between the two prongs 116. As the seat plug 112 continues to push downwardly, the curved inner surface 239 of the base 238 of the standing valve 222 will engage the outer surfaces of the tapered distal ends 118 of the prongs 116 and push the prongs 116 inwardly back toward each other, thereby causing the ball 20 to be lifted and to be held between the two prongs 116. With the ball 20 lifted and held between the two prongs 116, the fluid that is to be drained may pass downwardly through the channel of the body 114 of the seat plug 112, through the channels 228 of the body portion 224 of the standing valve 222, through the ports 231 of the channels 228, into the interior of the body portion 224, around and underneath the ball 20, through the base 238 of the standing valve 222 and back down into the well formation. There may be some fluid that passes downwardly through the slots 226 and through the ports 231 of the slots 226, but the majority of the fluid will drain through the ports 231 of the channels 228, rather than the ports 231 of the slots 226.

The stem 232 of the standing valve 222 in this embodiment may also have an annular ridge 234 formed on its northern end, wherein the top surface 236 of the northern end of the stem 232 is slightly concave. The curvature of the top surface 236 of the northern end of the stem 232 of this embodiment may also correspond to the curvature of the ball 805 (see FIGS. 1A-1B) of the traveling valve 804. This allows for more surface area of the top surface 236 of the stem 232 to come in contact with the ball 805 of the traveling valve 804, thereby causing less damage to the ball 805 of the traveling valve 804. When the traveling valve 804 is lowered, the prongs 116 of the seat plug 112 slide into the slots 226 of the standing valve 222, and the stem 232 will contact the ball 805 of the traveling valve 804 and push it up off of its seat, thereby opening the traveling valve 804 and allowing pumped fluid to flow downwardly from the pump tubing, down through the traveling valve 804, through the standing valve 222, and down into the well formation.

In one embodiment of the present invention, the stem 232 may have a channel formed therethrough. This channel would allow for more flow area through the body portion 224 of the standing valve 222. This additional flow area may help to reduce the movement of the ball 20 within the interior of the body portion 224, thus lessening the wear and tear of the standing valve 222.

Figure 18:
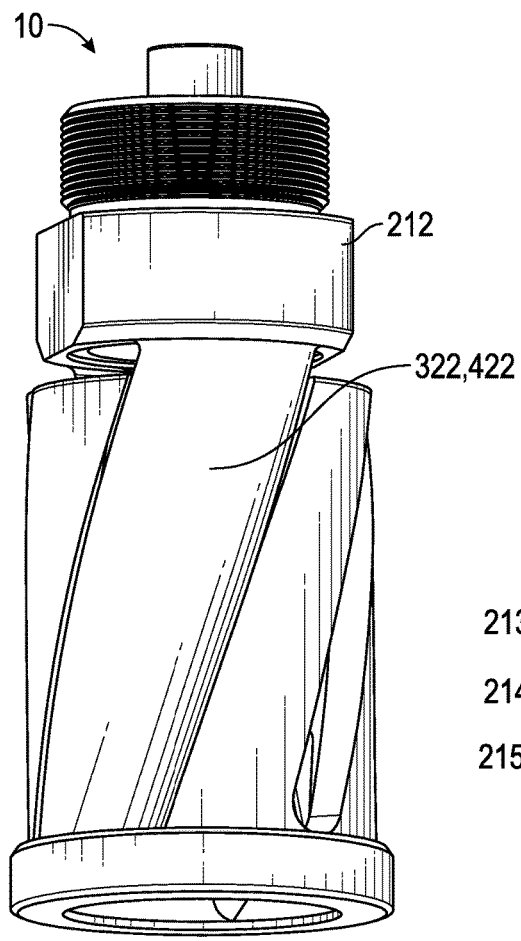
FIG. 18 a perspective view of another embodiment of the dump valve assembly, in accordance with one or more aspects of the present invention.
Figure 19:
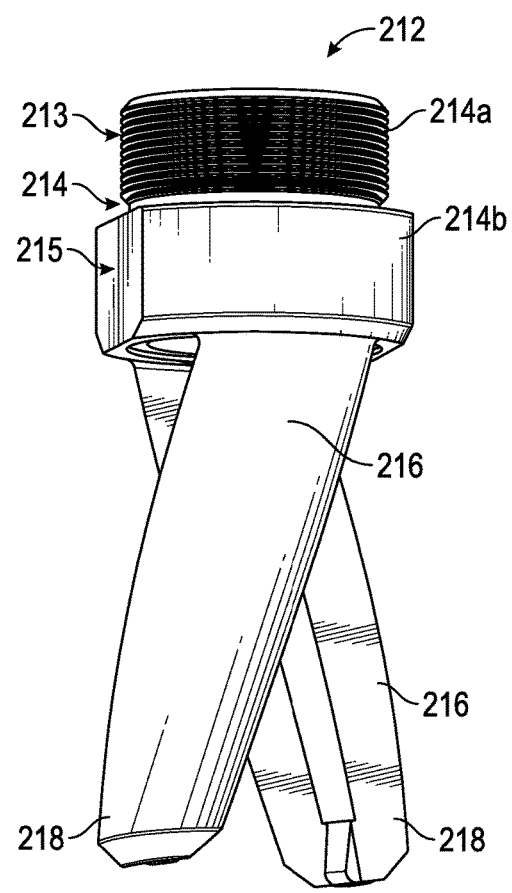
FIG. 19 a perspective view of one embodiment of a seat plug of the dump valve assembly of FIG. 18, in accordance with one or more aspects of the present invention.

FIGS. 18-24 show another embodiment of the dump valve assembly 10 of the present invention. As shown in FIG. 18, the dump valve assembly 10 has a standing valve 322, 422 and a seat plug 212. The seat plug 212 (referred to generically as seat plug 12) is adapted to mate with the standing valve 322, 422. Referring to FIG. 19, one embodiment of the seat plug 212 of the dump valve assembly 10 is shown. The seat plug 212 is dimensioned to mate with standing valve 322, 422 (described below). The seat plug 212 may have a cylindrical body 214 with a channel formed therethrough. The body 214 may have a first section 214a and a second section 214b, wherein the first section 214a has a smaller outer diameter than the second section 214b. The first section 214a may have threading 213 in order to couple it to the threaded southern end of the traveling valve 804. The second section 214b may also have wrench flats 215 formed on its outer surface. The body 214 may have two prongs 216 positioned opposite from each other and extending downwardly from a southern end of the body 214. It should be clearly understood, however, that any number of prongs 216 may be used. In this embodiment, the prongs 216 may extend downwardly and helically from the southern end of the body 214 (see FIG. 19). The prongs 116 may be slightly angled so that the southern ends of the prongs 216 are closer together than the northern ends of the prongs 216. In other words, the distance between the northern ends of the two prongs 216 may be equal to or slightly greater than the diameter of the ball 20 while the distance between the southern ends of the two prongs 216 may be smaller than the diameter of the ball 20. For example, if the ball 20 has a diameter of 2.5 inches, then the space between the inner surfaces of the northern ends of the two prongs 216 may also be 2.5 inches or it may be 2.5 inches plus between 0.015-0.020 inches while the space between the inner surfaces of the southern ends of the two prongs 216 may be 2.5 inches minus between 0.015-0.020 inches. Of course, the distance between the two prongs 216 depends upon the size of the ball 20 within the standing valve 322, 422 that the seat plug 212 is mating with. Each of the prongs 216 may be curved on their inner surfaces in order to correspond to the curvature of the ball 20 that is housed within the standing valve 322, 422. The prongs 216 of the seat plug 212 may be positioned a predetermined distance apart; e.g. the space between the inner surfaces of the prongs 216 may be smaller than the diameter of the ball 20.

The prongs 216 of the seat plug 212 may each have a tapered distal end 218. The tapered distal ends 218 may each be tapered on its inner surface so that the space between the inner surfaces of the tapered distal ends 218 is slightly greater than the space between the inner surfaces of the prongs 216 in the area above the tapered distal ends 218. The space between the inner surfaces of the tapered distal ends 218, however, may still be smaller than the diameter of the ball 20. In furtherance of the example above, if the space between the inner surfaces of the southern ends of the two prongs 216 above the tapered distal ends 218 is 2.5 inches minus between 0.015-0.020 inches, then the space between the inner surfaces of the two tapered distal ends 218 of the prongs 216 may be approximately $1/16$ inch greater. This allows the tapered distal ends 218 of the prongs 216 to fit around a top portion of the ball 20, which helps to guide the ball 20 into the space between the prongs 216 as the seat plug 212 is pushed downwardly onto the ball 20 during the drainage process. Each of the tapered distal ends 218 of the prongs 216 may also be tapered on its outer surface in order to correspond to a curved interior surface 339, 439 of the base 338, 438 of the standing valve 322, 422 (discussed and shown in FIG. 20 and FIG. 24 below).

Figure 21:
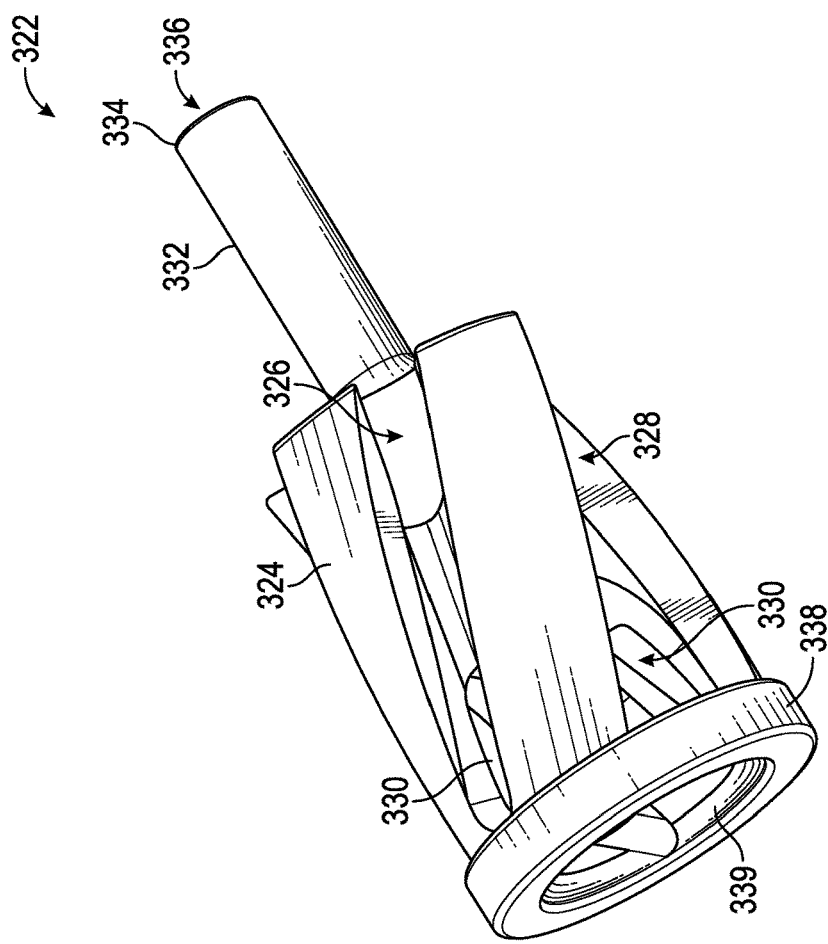
FIG. 21 is a an alternate perspective view of the standing valve of FIG. 20.
Figure 20:
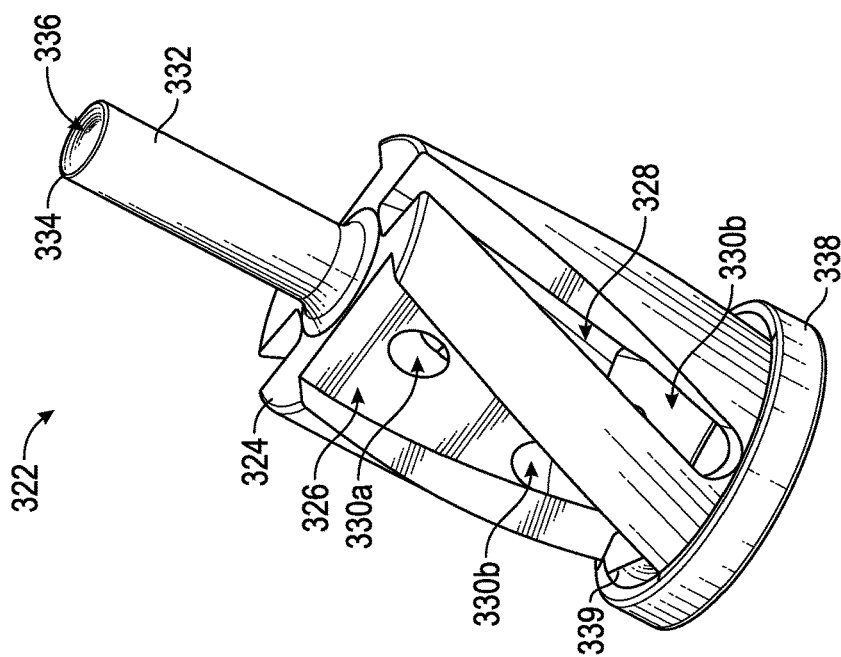
FIG. 20 is a perspective view of one embodiment of the standing valve of the dump valve assembly of FIG. 18, in accordance with one or more aspects of the present invention.
Figure 22:
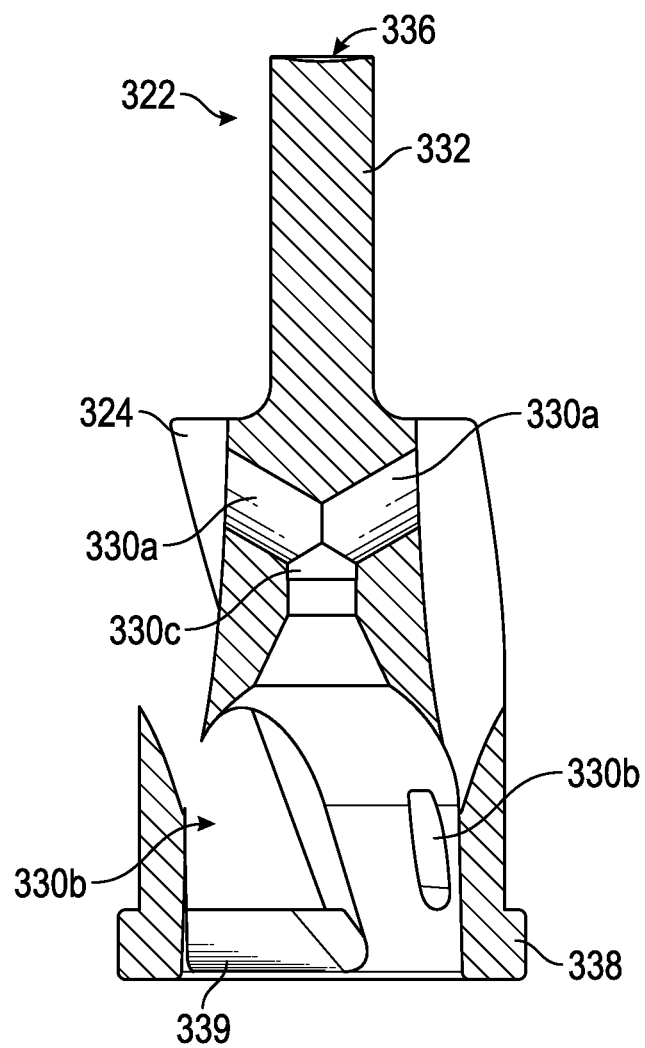
FIG. 22 is a side cross-sectional view of the standing valve of FIG. 20.

Referring to FIGS. 20-22, the standing valve 322 (referred to generically as standing valve 22) has a body portion 324, a stem 332 coupled to and extending upwardly from a northern end of the body portion 324, and an annular base 338 coupled to the southern end of the body portion 324. The body portion 324 of the standing valve 322 may have two opposing slots 326 (see FIG. 20) formed along the entire length of the body portion 324. The two opposing slots 326 are also dimensioned to receive the two prongs 216 of the seat plug 212; i.e. the two prongs 216 of the seat plug 212 may slide downwardly into the two slots 326 and may slide upwardly out of the two slots 326. The number of slots 326 may equal the number of prongs 216 of the corresponding seat plug 212. The body portion 324 may also have two opposing channels 328 (see FIG. 21) formed along the entire length of the body portion 324. Each channel 328 is positioned between the two slots 326 (see FIG. 20). As shown, the channels 328 may be narrower in width than the slots 326. If there are more than two slots 326, then there may be more than two channels 328, wherein each channel 328 is positioned between two of the slots 326.

The body portion 324 of the standing valve 322 may also have a plurality of ports 330. In this embodiment, the body portion 324 may have two top ports 330a located proximate a northern end of the body portion 324 and four bottom ports 330b located proximate a southern end of the body portion 324. Each slot 326 may have one top port 330a and one bottom port 330b (see FIG. 20). However, each channel 328 may have only one bottom port 330b and may not have a top port 330a (see FIG. 20). The bottom ports 330b are formed within the slots 326 and the channels 328 and lead to the interior of the body portion 324 of the standing valve 322. The bottom ports 330b located within the slots 326 may be in the shape of a slanted half-oval or an inverted U (see FIG. 20); the bottom ports 330b located within the channels 328 may be in the shape of a slanted complete oval. The top ports 330a are formed only within the slots 326 and may have a circular shape (see FIG. 20). Like the bottom ports 330b, the top ports 330a also lead to the interior of body portion 324 of the standing valve 322. The top ports 330a may meet at a center port 230c (see FIG. 22), which is located within the interior of the body portion 324 and positioned at a center of the northern end of the body portion 324.

During the upstroke of the pump assembly 806, formation pressure causes the ball 20 within the standing valve 322 to unseat and move upward, allowing the pumped fluid (e.g. oil) to pass through the standing valve 322 and up into the pump barrel 802 of the pump system 800. The pumped fluid may pass through the annular base 338 of the standing valve 322, into interior of the body portion 324, and around the unseated ball 20. The pumped fluid may then exit the body portion 324 by flowing out of the ports 330. Pumped fluid may travel around the lower part of the unseated ball 20 and may exit the body portion 324 through the bottom ports 330b. Pumped fluid may also travel around the upper part of the unseated ball 20 and may exit the body portion 324 through the center port 230c and the top ports 330a. This flow of the pumped fluid creates a hydraulic cushion around the unseated ball 20 within the interior of the body portion 324 which prevents the unseated ball 20 from moving too much within the interior of the body portion 324, thereby minimizing wear and tear of the standing valve 322.

In this embodiment, the body portion 324 has a helical or spiral shape throughout its entire length. The helical shape of the body portion 324 of the standing valve 322 is beneficial for high volume gassy oil wells. As the pumped fluid exits the body portion 324 of the standing valve 322 through the ports 330, the helical shape of the body portion 324 imparts a cyclone effect on the pumped fluid during an upstroke of the pump assembly 806, creating a centrifuge with the pumped fluid. This cyclone effect forces heavier material (i.e. pumped fluid that contains solids such as sand) outward while the gas within the pumped fluid moves toward the center of the pump assembly 806. This causes the formation of a vertical column of gas, thereby allowing the gas to quickly evacuate from the valve area. Without the helical shape of the body portion 324, in a highly gassy fluid, the gas would be broken up within the pumped fluid as gas bubbles, which will move slowly through the valve system causing inherent gas lock to the pump. Gas lock reduces the efficiency of pumping operations and thus costs the operator more money to retrieve the oil from the well.

After the pumping operations have ceased, the ball 20 will fall back down and seat itself, thereby closing the standing valve 322. If it is desired to drain the pump tubing, the ball 20 within the standing valve 322 must be moved in order to open the standing valve 322 and allow the drainage to occur. The prongs 216 of the seat plug 212 may be lowered and slid into the corresponding slots 326 of the standing valve 322. The inner surfaces of the tapered distal ends 218 of the prongs 216 will then begin to engage the top portion of the ball 20. The base 338 of the standing valve 322 may have a curved inner surface 339 (see FIG. 20) that is dimensioned to correspond with the outer surface of the tapered distal ends 218 of the prongs 216. The entire inner surface 339 of the base 338 of the standing valve 322 may be curved, or substantial benefit may still be derived if only some portions of the inner surface 339 of the base 338 were curved (particularly, the areas of the base 338 that are directly beneath the slots 326). Thus, as the seat plug 212 is pushed downwardly, the prongs 216 will slightly spread apart as the ball 20 is pushed between the two prongs 216. As the seat plug 212 continues to push downwardly, the curved inner surface 339 of the base 338 of the standing valve 322 will engage the outer surfaces of the tapered distal ends 218 of the prongs 216 and push the prongs 216 inwardly back toward each other, thereby causing the ball 20 to be lifted and to be held between the two prongs 216. With the ball 20 lifted and held between the two prongs 216, the fluid that is to be drained may pass downwardly through the channel of the body 214 of the seat plug 212, through the channels 328 of the standing valve 322, through the bottom ports 330b of the channels 328, into the interior of the body portion 324 of the standing valve 322, around and underneath the ball 20, through the base 338 of the standing valve 322 and back down into the well formation. There may be some fluid that passes downwardly through the slots 326 and through the bottom ports 330b of the slots 326, but the majority of the fluid will drain through the bottom ports 330b of the channels 328, rather than the bottom ports 330b of the slots 326.

The stem 332 of the standing valve 322 may have an annular ridge 334 formed on its northern end, wherein the top surface 336 of the northern end of the stem 332 is slightly concave. The curvature of the top surface 336 of the northern end of the stem 332 of this embodiment may also correspond to the curvature of the ball 805 (see FIGS. 1A-1B) of the traveling valve 804. This allows for more surface area of the top surface 336 of the stem 332 to come in contact with the ball 805 of the traveling valve 804, thereby causing less damage to the ball 805 of the traveling valve 804. When the traveling valve 804 is lowered, the prongs 216 of the seat plug 212 slide into the slots 326 of the standing valve 322, and the stem 332 will contact the ball 805 of the traveling valve 804 and push it up off of its seat, thereby opening the traveling valve 804 and allowing pumped fluid to flow downwardly from the pump tubing, down through the traveling valve 804, through the standing valve 322, and down into the well formation.

In one embodiment of the present invention, the stem 332 may have a channel formed therethrough. This channel would allow for more flow area through the body portion 324 of the standing valve 322. This additional flow area may help to reduce the movement of the ball 20 within the interior of the body portion 324, thus lessening the wear and tear of the standing valve 322.

Figure 23:
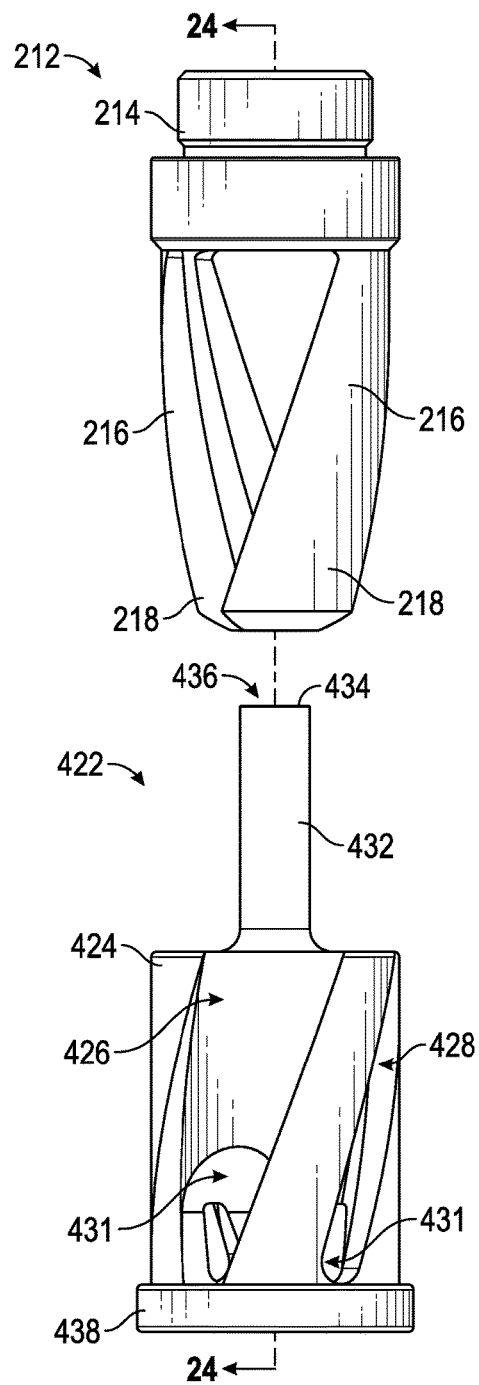
FIG. 23 is an exploded side view of the dump valve assembly of FIG. 18, shown with another embodiment of the standing valve.
Figure 24:
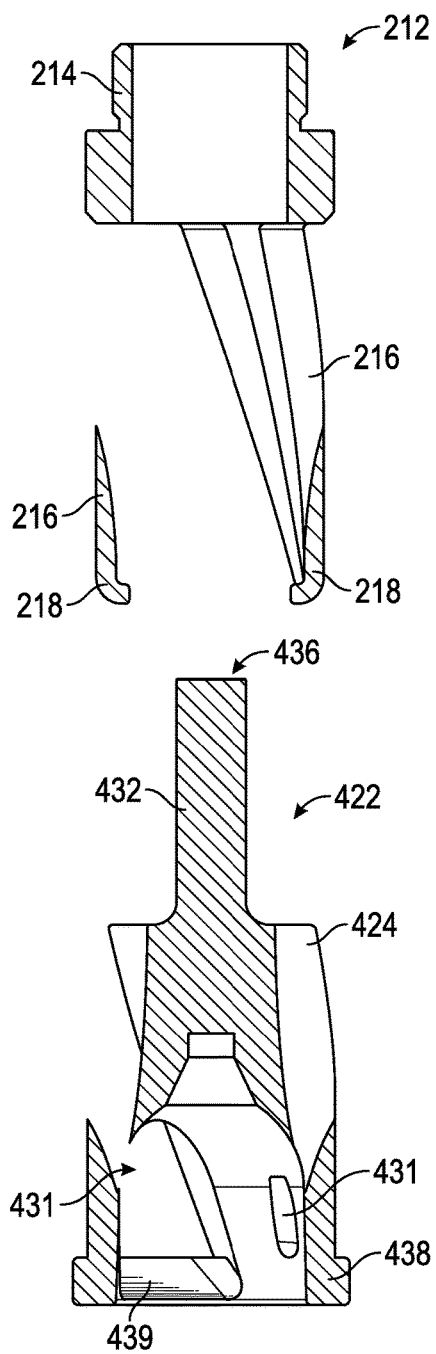
FIG. 24 is a side cross-sectional view of the dump valve assembly of FIG. 18, shown with the standing valve of FIG. 23.

Referring to FIGS. 23-24, the standing valve 422 (referred to generically as standing valve 22) has a body portion 424, a stem 432 coupled to and extending upwardly from a northern end of the body portion 424, and an annular base 438 coupled to the southern end of the body portion 424. The body portion 424 of the standing valve 422 may have two opposing slots 426 (see FIG. 23) formed along the entire length of the body portion 424. The two opposing slots 426 are also dimensioned to receive the two prongs 216 of the seat plug 212; i.e. the two prongs 216 of the seat plug 212 may slide downwardly into the two slots 426 and may slide upwardly out of the two slots 426. The number of slots 426 may equal the number of prongs 216 of the corresponding seat plug 212. The body portion 424 may also have two opposing channels 428 (see FIG. 23) formed along the entire length of the body portion 424. Each channel 428 is positioned between the two slots 426 (see FIG. 23). As shown, the channels 428 may be narrower in width than the slots 426. If there are more than two slots 426, then there may be more than two channels 428, wherein each channel 428 is positioned between two of the slots 426.

In this embodiment, the standing valve 422 may have four ports 431 located proximate the southern end of the body portion 424. Each slot 426 has one port 431 (see FIG. 23) formed therein and each channel 428 has one port 431 formed therein (see FIG. 23). The ports 431 are formed within the slots 426 and the channels 428 and all lead to the interior of the body portion 424 of the standing valve 422. The ports 431 located within the slots 426 may be in the shape of a slanted half-oval or an inverted U (see FIG. 23); while the ports 431 located within the channels 428 may be in the shape of a slanted complete oval (see FIG. 23).

During the upstroke of the pump assembly 806, formation pressure causes the ball 20 within the standing valve 422 to unseat and move upward, allowing the pumped fluid (e.g. oil) to pass through the standing valve 422 and up into the pump barrel 802 of the pump system 800. The pumped fluid may pass through the annular base 438 of the standing valve 422, into interior of the body portion 424, and around the unseated ball 20. The pumped fluid may then exit the body portion 424 by flowing out of the ports 431. Pumped fluid may travel around the lower part of the unseated ball 20 and may exit the body portion 424 through the ports 431 formed within the slots 426 and through a bottom portion of the ports 431 formed within the channels 428. Pumped fluid may also travel around the upper part of the unseated ball 20 and may exit the body portion 424 through a top portion of the ports 431 formed within the channels 428. This flow of the pumped fluid creates a hydraulic cushion around the unseated ball 20 within the interior of the body portion 424 which prevents the unseated ball 20 from moving too much within the interior of the body portion 424, thereby minimizing wear and tear of the standing valve 422.

In this embodiment, the body portion 424 has a helical or spiral shape throughout its entire length. The helical shape of the body portion 424 of the standing valve 422 is beneficial for high volume gassy oil wells. As the pumped fluid exits the body portion 424 of the standing valve 422 through the ports 430, the helical shape of the body portion 424 imparts a cyclone effect on the pumped fluid during an upstroke of the pump assembly 806, creating a centrifuge with the pumped fluid. This cyclone effect forces heavier material (i.e. pumped fluid that contains solids such as sand) outward while the gas within the pumped fluid moves toward the center of the pump assembly 806. This causes the formation of a vertical column of gas, thereby allowing the gas to quickly evacuate from the valve area. Without the helical shape of the body portion 424, in a highly gassy fluid, the gas would be broken up within the pumped fluid as gas bubbles, which will move slowly through the valve system causing inherent gas lock to the pump. Gas lock reduces the efficiency of pumping operations and thus costs the operator more money to retrieve the oil from the well.

After the pumping operations have ceased, the ball 20 will fall back down and seat itself, thereby closing the standing valve 422. If it is desired to drain the pump tubing, the ball 20 within the standing valve 422 must be moved in order to open the standing valve 422 and allow the drainage to occur. The prongs 216 of the seat plug 212 may be lowered and slid into the corresponding slots 426 of the standing valve 422. The inner surfaces of the tapered distal ends 218 of the prongs 216 will then begin to engage the top portion of the ball 20. The base 438 of the standing valve 422 may have a curved inner surface 439 that is dimensioned to correspond with the outer surface of the tapered distal ends 218 of the prongs 216. The entire inner surface 439 of the base 438 of the standing valve 422 may be curved, or substantial benefit may still be derived if only some portions of the inner surface 439 of the base 438 were curved (particularly, the areas of the base 438 that are directly beneath the slots 426). Thus, as the seat plug 212 is pushed downwardly, the prongs 216 will slightly spread apart as the ball 20 is pushed between the two prongs 216. As the seat plug 212 continues to push downwardly, the curved inner surface 439 of the base 438 of the standing valve 422 will engage the outer surfaces of the tapered distal ends 218 of the prongs 216 and push the prongs 216 inwardly back toward each other, thereby causing the ball 20 to be lifted and to be held between the two prongs 216. With the ball 20 lifted and held between the two prongs 216, the fluid that is to be drained may pass downwardly through the channel of the body 214 of the seat plug 212, through the channels 428 of the standing valve 422, through the ports 431 of the channels 428, into the interior of the body portion 424 of the standing valve 422, around and underneath the ball 20, through the base 438 of the standing valve 422 and back down into the well formation. There may be some fluid that passes downwardly through the slots 426 and through the ports 431 of the slots 426, but the majority of the fluid will drain through the ports 431 of the channels 428, rather than the ports 431 of the slots 426.

The stem 432 of the standing valve 422 may have an annular ridge 434 formed on its northern end, wherein the top surface 436 of the northern end of the stem 432 is slightly concave. The curvature of the top surface 436 of the northern end of the stem 432 of this embodiment may also correspond to the curvature of the ball 805 (see FIGS. 1A-1B) of the traveling valve 804. This allows for more surface area of the top surface 436 of the stem 432 to come in contact with the ball 805 of the traveling valve 804, thereby causing less damage to the ball 805 of the traveling valve 804. When the traveling valve 804 is lowered, the prongs 216 of the seat plug 212 slide into the slots 426 of the standing valve 422, and the stem 432 will contact the ball 805 of the traveling valve 804 and push it up off of its seat, thereby opening the traveling valve 804 and allowing pumped fluid to flow downwardly from the pump tubing, down through the traveling valve 804, through the standing valve 422, and down into the well formation.

In one embodiment of the present invention, the stem 432 may have a channel formed therethrough. This channel would allow for more flow area through the body portion 424 of the standing valve 422. This additional flow area may help to reduce the movement of the ball 20 within the interior of the body portion 424, thus lessening the wear and tear of the standing valve 422.

Figures 25, 26:
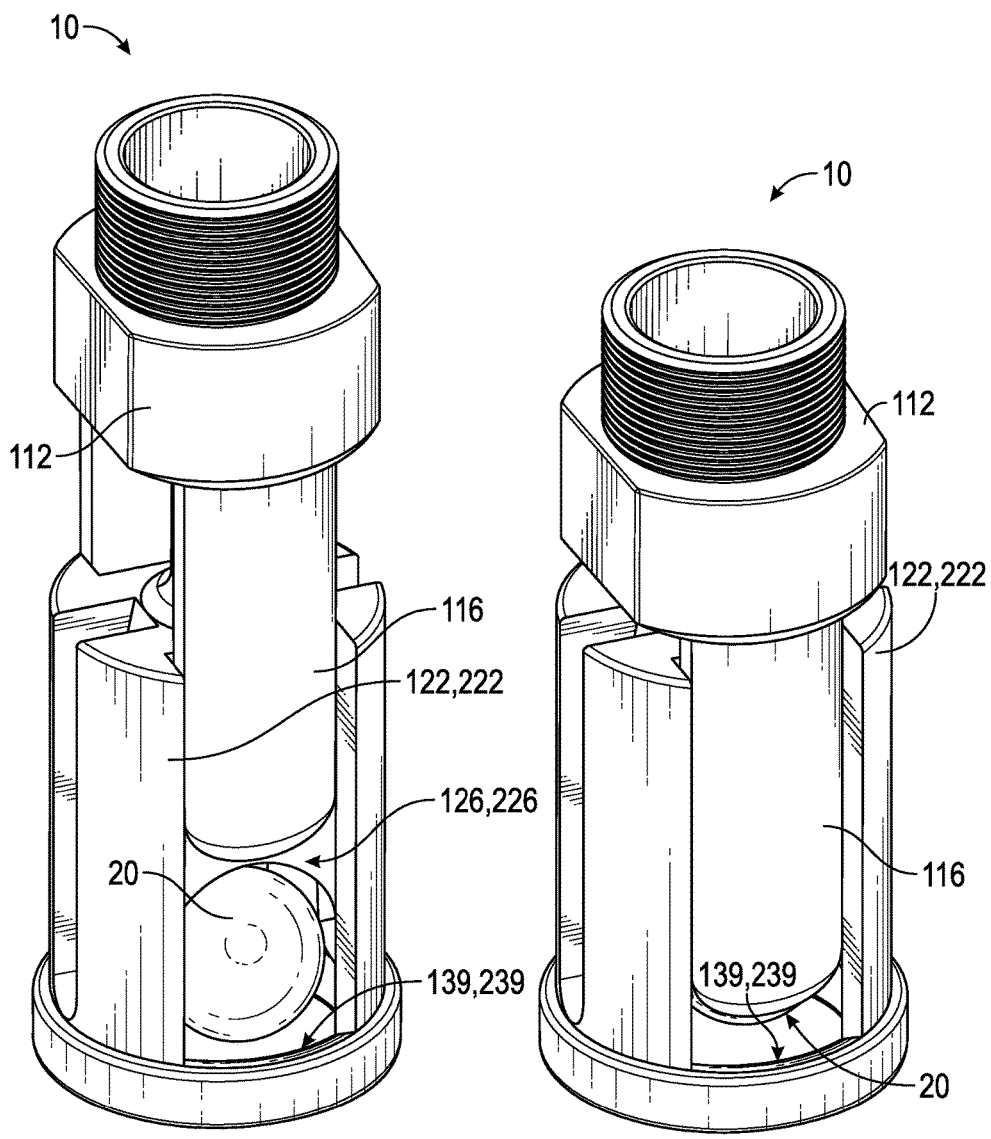
FIG. 25 is a perspective view of the dump valve assembly of FIG. 2, shown with the ball in a closed position in the standing valve.
FIG. 26 is a perspective view of the dump valve assembly of FIG. 2, shown with the ball in an open position in the standing valve.
Figure 27:
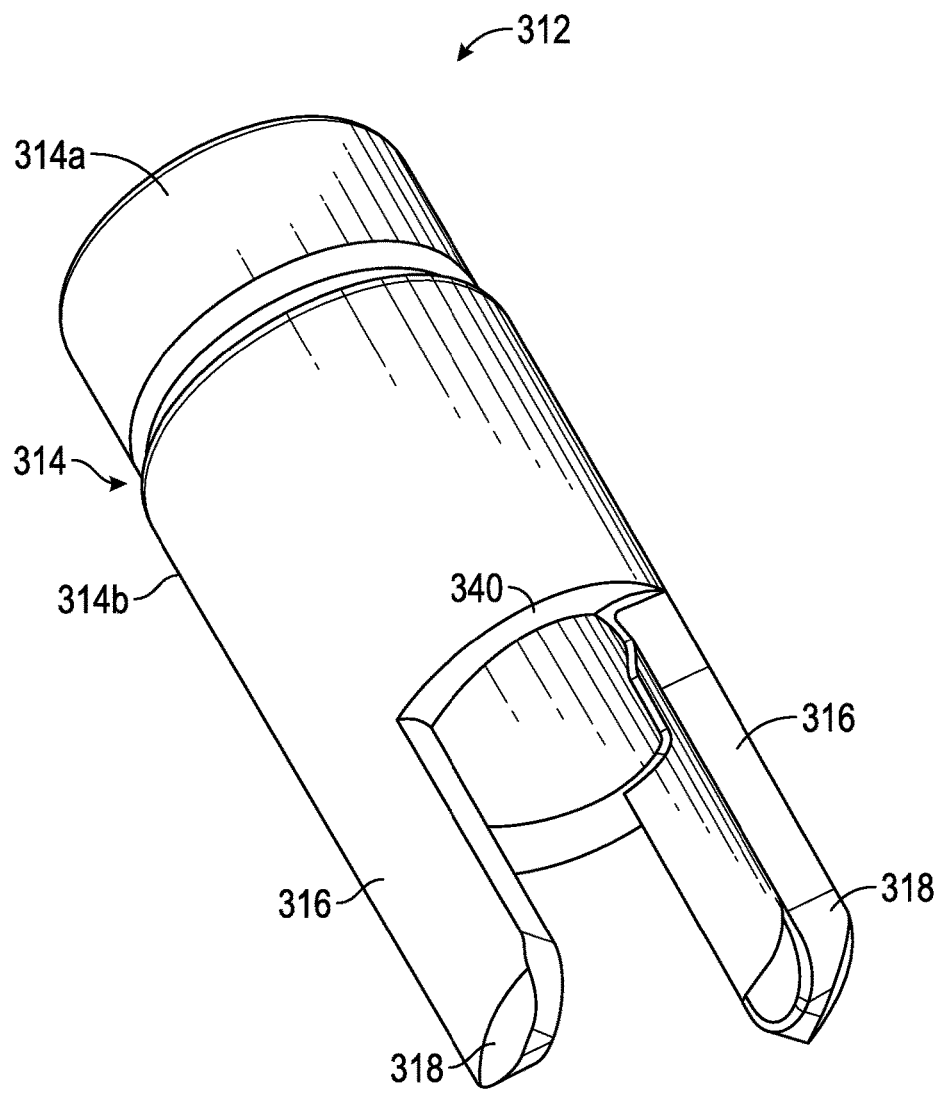
FIG. 27 is a perspective view of another embodiment of the seat plug of another embodiment of the dump valve assembly, in accordance with one or more aspects of the present invention.
Figure 30:
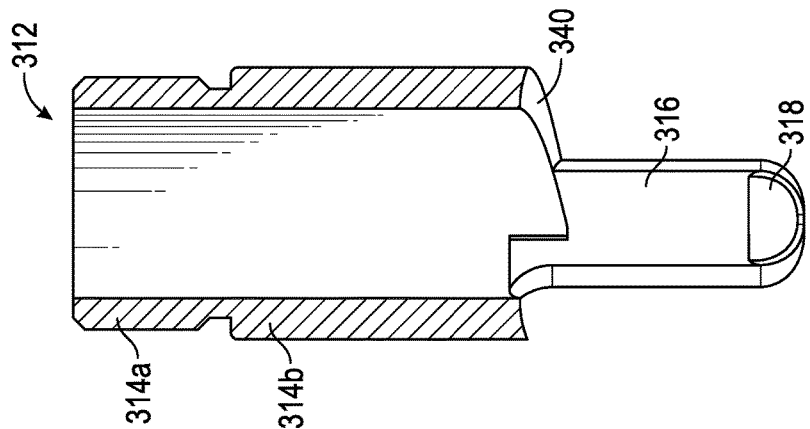
FIG. 30 is a side cross-sectional view of the seat plug of FIG. 27.
Figure 29:
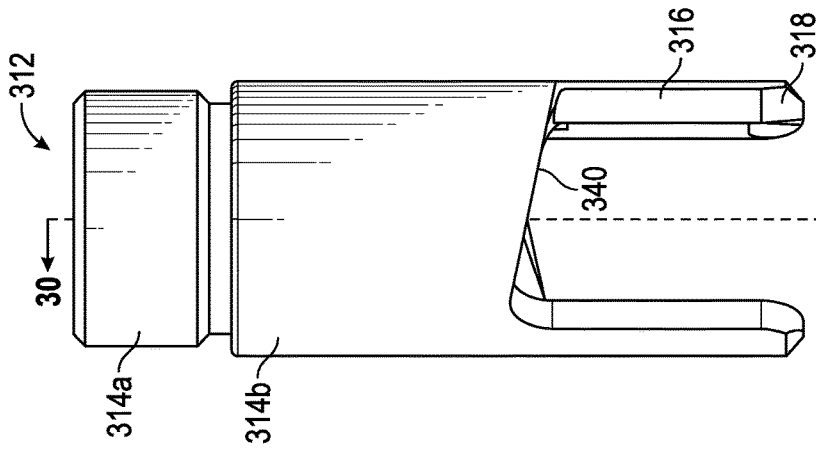
FIG. 29 is an alternate side view of the seat plug of FIG. 27.
Figure 28:
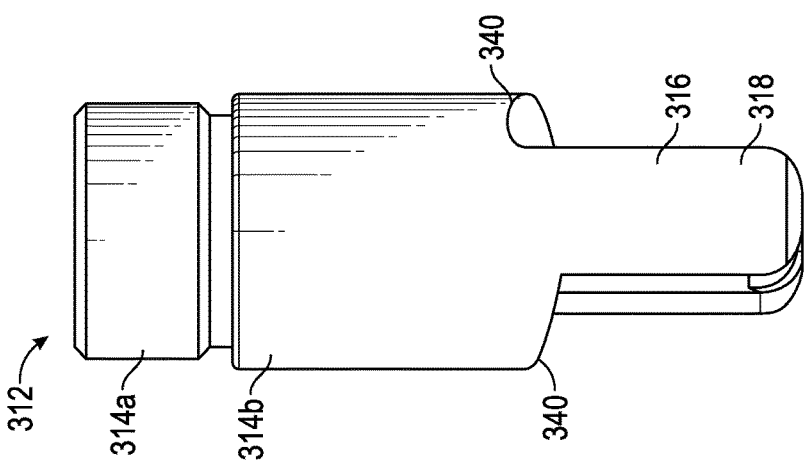
FIG. 28 is a side view of the seat plug of FIG. 27.
Figure 34:
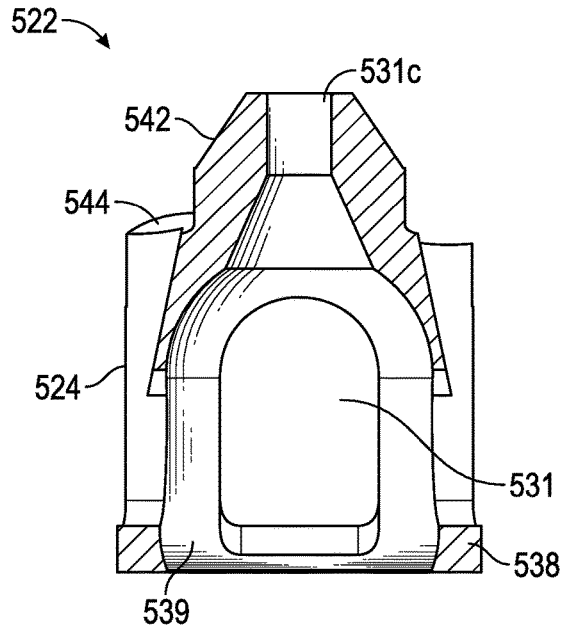
FIG. 34 is a side cross-sectional view of the standing valve of FIG. 31.
Figure 35:
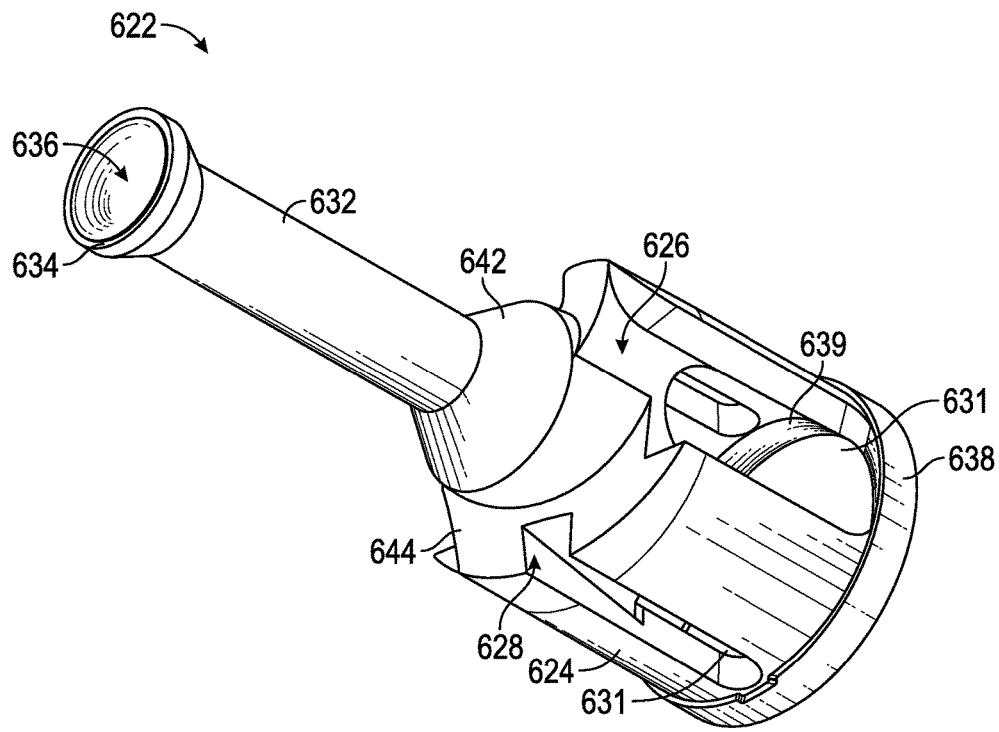
FIG. 35 is a perspective view of another embodiment of the standing valve of another embodiment of the dump valve assembly, in accordance with one or more aspects of the present invention.
Figure 36:
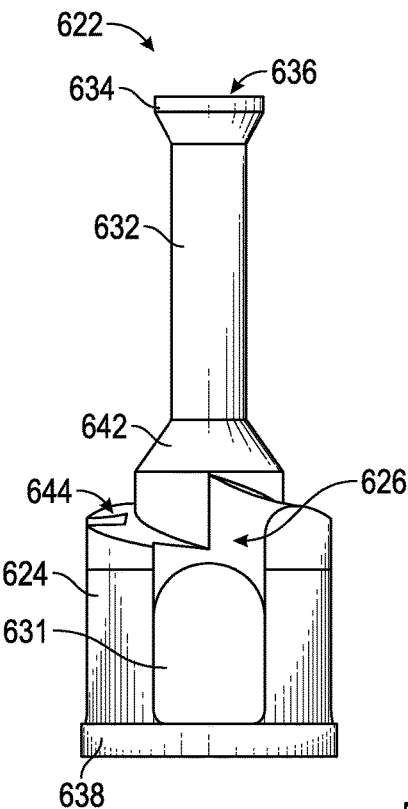
FIG. 36 is a side view of the standing valve of FIG. 35.
Figure 37:
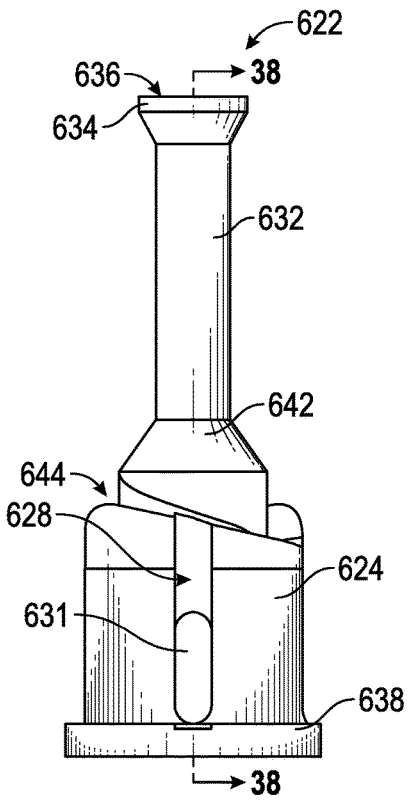
FIG. 37 is an alternate side view of the standing valve of FIG. 35.
Figure 38:
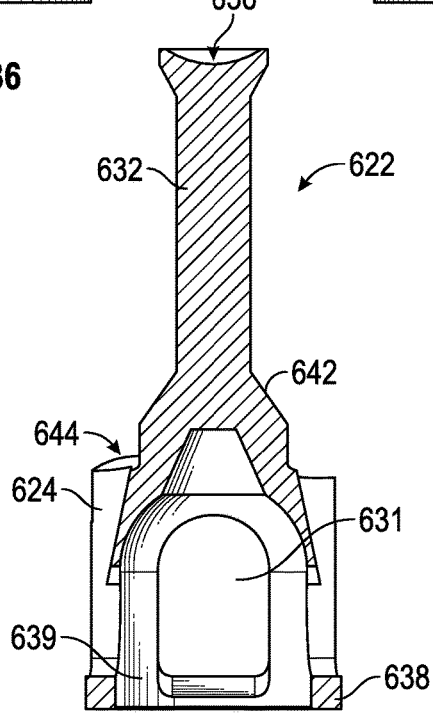
FIG. 38 is a side cross-sectional view of the standing valve of FIG. 35.
Figure 39:
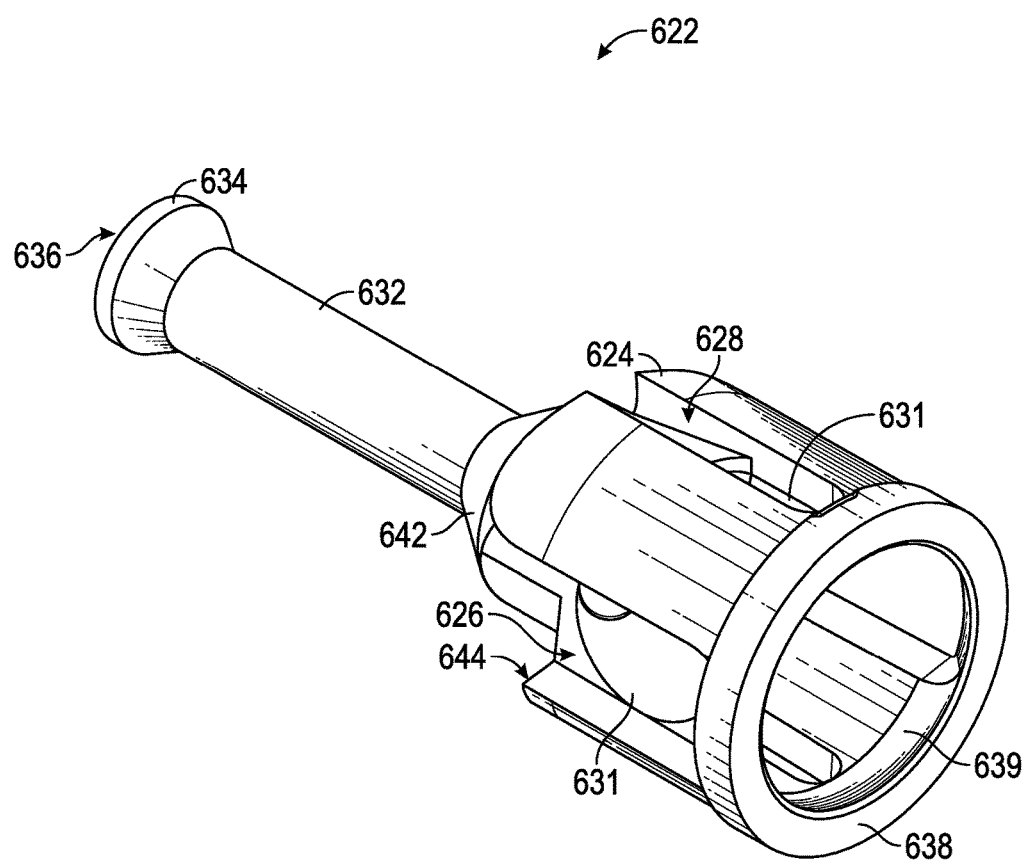
FIG. 39 is a bottom perspective view of the standing valve of FIG. 35.

FIGS. 25-26 show the embodiment of the dump valve assembly 10 of FIG. 2 the present invention in operation. In FIG. 25, the prongs 116 of the seat plug 112 are shown being lowered into the slots 126, 226 of the standing valve 122, 222. In FIG. 26, after the traveling valve 804 has been pushed downwardly during the draining process, the prongs 116 of the seat plug 112 engage the ball 20 of the standing valve 122, 222 and lift the ball 20 so that pumped fluid may flow downwardly back down into the well formation.

FIG. 27-30 show another embodiment of the seat plug 312 (referred to generically as seat plug 12) of the present invention. This seat plug 312 may be adapted to mate with the embodiments of the standing valve 522, 622 shown in FIGS. 31-39 (discussed below). In this embodiment, the seat plug 312 may have a cylindrical body 314 with a channel formed therethrough. The body 314 may have a first section 314a and a second section 314b, wherein the first section 314a has a smaller outer diameter than the second section 314b. The first section 314a may have threading in order to couple it to the threaded southern end of an anti-gas valve. The second section 314b may also have wrench flats formed on its outer surface. The second section 314b may have angled bottom edges 340 (see FIGS. 28 and 29) so that the seat plug 312 will mate with the corresponding standing valve 522, 622 (discussed below). The body 314 may have two prongs 316 positioned opposite from each other and extending downwardly from a southern end of the body 314.

It should be clearly understood, however, that any number of prongs 316 may be used. In this embodiment, the prongs 316 may also be positioned parallel to each other and may extend downwardly and perpendicularly from the southern end of the body 314. Alternatively, the prongs 316 may be slightly angled so that the southern ends of the prongs 316 are closer together than the northern ends of the prongs 316. In other words, the distance between the northern ends of the two prongs 316 may be equal to or slightly greater than the diameter of the ball 20 while the distance between the southern ends of the two prongs 316 may be smaller than the diameter of the ball 20. For example, if the ball 20 has a diameter of 2.5 inches, then the space between the inner surfaces of the northern ends of the two prongs 316 may also be 2.5 inches or it may be 2.5 inches plus between 0.015-0.020 inches while the space between the inner surfaces of the southern ends of the two prongs 316 may be 2.5 inches minus between 0.015-0.020 inches. Of course, the distance between the two prongs 316 depends upon the size of the ball 20 within the standing valve 522, 622 that the seat plug 312 is mating with. Each of the prongs 316 may be curved on their inner surfaces in order to correspond to the curvature of the ball 20 that is housed within the corresponding standing valve 522, 622. The prongs 316 may be positioned a predetermined distance apart; e.g. the space between the inner surfaces of the prongs 316 may be smaller than the diameter of the ball 20.

The prongs 316 of the seat plug 312 may each have a tapered distal end 318. The tapered distal ends 318 may each be tapered on its inner surface so that the space between the inner surfaces of the tapered distal ends 318 is slightly greater than the space between the inner surfaces of the prongs 316 in the area above the tapered distal ends 318. The space between the inner surfaces of the tapered distal ends 318, however, may still be smaller than the diameter of the ball 20. In furtherance of the example above, if the space between the inner surfaces of the southern ends of the two prongs 316 above the tapered distal ends 318 is 2.5 inches minus between 0.015-0.020 inches, then the space between the inner surfaces of the two tapered distal ends 318 of the prongs 316 may be approximately 1/16 inch greater. This allows the tapered distal ends 318 of the prongs 316 to fit around a top portion of the ball 20, which helps to guide the ball 20 into the space between the prongs 316 as the seat plug 312 is pushed downwardly onto the ball 20 during the drainage process. Each of the tapered distal ends 318 of the prongs 316 may also be tapered on its outer surface in order to correspond to the curved interior surface 539, 639 of the base 538, 638 of the standing valve 522, 622 (discussed and shown in FIG. 31 and FIG. 35 below).

FIGS. 31-34 show another embodiment of the standing valve 522 (referred to generically as standing valve 22) of the present invention. The standing valve 522 may have a body portion 524 and an annular base 538 coupled to the southern end of the body portion 524. This embodiment of the standing valve 522 does not have a stem. In certain situations wherein the well formation has gas issues, an anti gas-valve such as the anti-gas valve described in U.S. Pat. No. 6,481,987 or the anti-gas valve described in U.S. Pat. No. 7,878,767 may be needed. The seat plug 312 may be coupled to the southern end of the anti-gas valve. In those cases, the standing valve 522 would not need a stem since the anti-gas valves are positive open and would lift the ball 805 of the traveling valve 804 with a drag plunger.

The body portion 524 of the standing valve 522 may have two opposing slots 526 (see FIG. 32) formed along a portion of the length of the body portion 524. The two opposing slots 526 are dimensioned to receive the two prongs 316 of the seat plug 312; i.e. the two prongs 316 of the seat plug 312 may slide downwardly into the two slots 526 and may slide upwardly out of the two slots 526. The number of slots 526 may equal the number of prongs 316 of the corresponding seat plug 312. The body portion 524 may also have two opposing channels 528 (see FIG. 33) formed along a portion of the length of the body portion 524. Each channel 528 is positioned between the two slots 526. As shown, the channels 528 may be narrower in width than the slots 526. If there are more than two slots 526, then there may be more than two channels 528, wherein each channel 528 is positioned between two of the slots 526.

The body portion 524 of the standing valve 522 may also have a frustoconical top 542 and a helical groove 544. The helical groove 544 may be formed within a northern part of the body portion 524 of the standing valve 522 and may spiral downwardly along the length of the body portion 524 from the frustoconical top 542 to a point positioned above one of the slots 526 (see FIG. 32).

In this embodiment, the standing valve 522 may have four ports 531 located proximate the southern end of the body portion 524. Each slot 526 has one port 531 (see FIG. 32) formed therein and each channel 528 has one port 531 formed therein (see FIG. 33). The ports 531 are formed within the slots 526 and the channels 528 and all lead to the interior of the body portion 524 of the standing valve 522 (see FIG. 34). The ports 531 located within the slots 526 may be in the shape of a half-oval or an inverted U (see FIG. 32); while the ports 531 located within the channels 528 may be in the shape of a complete oval (see FIG. 33). The ports 531 located within the channels 528 may be shorter in length than the ports 531 located within the slots 526. The standing valve 522 may also have a center port 531$c$ (see FIG. 34) located within the interior of the body portion 524 and positioned at a center of the northern end of the body portion 524. The center port 531$c$ also leads to the interior of the body portion 524.

During the upstroke of the pump assembly 806, formation pressure causes the ball 20 within the standing valve 522 to unseat and move upward, allowing the pumped fluid (e.g. oil) to pass through the standing valve 522 and up into the pump barrel 802 of the pump system 800. With this embodiment, the pumped fluid may pass through the annular base 538 of the standing valve 522, into interior of the body portion 524, and around the unseated ball 20. The pumped fluid may then exit the body portion 524 by flowing out of the ports 531. Pumped fluid may travel around the lower part of the unseated ball 20 and may exit the body portion 524 through the ports 531 formed within the slots 526 and through the ports 531 formed within the channels 528. Pumped fluid may also travel around the upper part of the unseated ball 20 and may exit the body portion 524 through the center port 531$c$. The flow of the pumped fluid creates a hydraulic cushion around the unseated ball 20 within the interior of the body portion 524 which prevents the unseated ball 20 from moving too much within the interior of the body portion 524, thereby minimizing wear and tear of the standing valve 522.

After the pumping operations have ceased, the ball 20 will fall back down and seat itself, thereby closing the standing valve 522. If it is desired to drain the pump tubing, the ball 20 within the standing valve 522 must be moved in order to open the standing valve 522 and allow the drainage to occur. The prongs 316 of the seat plug 312 may be lowered and slid into the corresponding slots 526 of the standing valve 522. If the prongs 316 of the seat plug 312 do not properly align with the corresponding slots 526, the prongs 316 may contact and slide downwardly and helically along the helical groove 544 formed on the body portion 524 of the standing valve 522. The helical groove 544, therefore, helps to guide the prongs 316 of the seat plug 312 into the corresponding slots 526. The inner surfaces of the tapered distal ends 318 of the prongs 316 will then begin to engage the top portion of the ball 20. The base 538 of the standing valve 522 may also have a curved inner surface 539 that is dimensioned to correspond with the outer surface of the tapered distal ends 318 of the prongs 316 of the seat plug 312. The entire inner surface 539 of the base 538 of the standing valve 522 may be curved, or substantial benefit may still be derived if only some portions of the inner surface 539 of the base 538 were curved (particularly, the areas of the base 538 that are directly beneath the slots 526). Thus, as the seat plug 312 is pushed downwardly, the prongs 316 will slightly spread apart as the ball 20 is pushed between the two prongs 316. As the seat plug 312 continues to push downwardly, the curved inner surface 539 of the base 538 of the standing valve 522 will engage the outer surfaces of the tapered distal ends 318 of the prongs 316 and push the prongs 316 inwardly back toward each other, thereby causing the ball 20 to be lifted and to be held between the two prongs 316. With the ball 20 lifted and held between the two prongs 316, the fluid that is to be drained may pass downwardly through the channel of the body 314 of the seat plug 312, through the channels 528 of the body portion 524 of the standing valve 522, through the ports 531 of the channels 528, into the interior of the body portion 524, around and underneath the ball 20, through the base 538 of the standing valve 522 and back down into the well formation. There may be some fluid that passes downwardly through center port 531*c* and/or the slots 526 and through the ports 531 of the slots 526, but the majority of the fluid will drain through the ports 531 of the channels 528, rather than the ports 531 of the slots 526.

FIGS. 35-39 show another embodiment of the standing valve 622 (referred to generically as standing valve 22) of the present invention. The standing valve 622 may have a body portion 624, a stem 632, and an annular base 638 coupled to the southern end of the body portion 624. The body portion 624 of the standing valve 622 may have two opposing slots 626 (see FIG. 36) formed along a portion of the length of the body portion 624. The two opposing slots 626 are dimensioned to receive the two prongs 316 of the seat plug 312; i.e. the two prongs 316 of the seat plug 312 may slide downwardly into the two slots 626 and may slide upwardly out of the two slots 626. The number of slots 626 may equal the number of prongs 316 of the corresponding seat plug 312. The body portion 624 may also have two opposing channels 628 (see FIG. 37) formed along a portion of the length of the body portion 624. Each channel 628 is positioned between the two slots 626. As shown, the channels 628 may be narrower in width than the slots 626. If there are more than two slots 626, then there may be more than two channels 628, wherein each channel 628 is positioned between two of the slots 626.

The body portion 624 of the standing valve 622 may also have a frustoconical top 642 and a helical groove 644. The stem 632 may be coupled to and extend upwardly from the frustoconical top 642 of the body portion 624 of the standing valve 622. The helical groove 644 may be formed within the body portion 624 of the standing valve 622 and may spiral downwardly along the length of the body portion 624 from the frustoconical top 642 to a point positioned above one of the slots 626 (see FIG. 35).

In this embodiment, the standing valve 622 may have four ports 631 located proximate the southern end of the body portion 624. Each slot 626 has one port 631 (see FIG. 36) formed therein and each channel 628 has one port 631 formed therein (see FIG. 37). The ports 631 are formed within the slots 626 and the channels 628 and all lead to the interior of the body portion 624 of the standing valve 622. The ports 631 located within the slots 626 may be in the shape of a half-oval or an inverted U (see FIG. 36); while the ports 631 located within the channels 628 may be in the shape of a complete oval (see FIG. 37). The ports 631 located within the channels 628 may be shorter in length than the ports 631 located within the slots 626.

During the upstroke of the pump assembly 806, formation pressure causes the ball 20 within the standing valve 622 to unseat and move upward, allowing the pumped fluid (e.g. oil) to pass through the standing valve 622 and up into the pump barrel 802 of the pump system 800. With this embodiment, the pumped fluid may pass through the annular base 638 of the standing valve 622, into interior of the body portion 624, and around the unseated ball 20. The pumped fluid may then exit the body portion 624 by flowing out of the ports 631. Pumped fluid may travel around the lower part of the unseated ball 20 and may exit the body portion 624 through the ports 631 formed within the slots 626 and through the ports 631 formed within the channels 628. Pumped fluid may also travel around the upper part of the unseated ball 20 and may exit the body portion 624 through a top portion of the ports 631 formed within the channels 628. This configuration also allows the flow of the pumped fluid to create a hydraulic cushion around the unseated ball 20 within the interior of the body portion 624 which prevents the unseated ball 20 from moving too much within the interior of the body portion 624, thereby minimizing wear and tear of the standing valve 622.

After the pumping operations have ceased, the ball 20 will fall back down and seat itself, thereby closing the standing valve 622. If it is desired to drain the pump tubing, the ball 20 within the standing valve 622 must be moved in order to open the standing valve 622 and allow the drainage to occur. The prongs 316 of the seat plug 312 may be lowered and slid into the corresponding slots 626 of the standing valve 622. If the prongs 316 of the seat plug 312 do not properly align with the corresponding slots 626, the prongs 316 may contact and slide downwardly and helically along the helical groove 644 formed on the body portion 624 of the standing valve 622. The helical groove 644, therefore, helps to guide the prongs 316 of the seat plug 312 into the corresponding slots 626. The inner surfaces of the tapered distal ends 318 of the prongs 316 will then begin to engage the top portion of the ball 20. The base 638 of the standing valve 622 may also have a curved inner surface 639 that is dimensioned to correspond with the outer surface of the tapered distal ends 318 of the prongs 316 of the seat plug 312. The entire inner surface 639 of the base 638 of the standing valve 522 may be curved, or substantial benefit may still be derived if only some portions of the inner surface 639 of the base 638 were curved (particularly, the areas of the base 638 that are directly beneath the slots 626). Thus, as the seat plug 312 is pushed downwardly, the prongs 316 will slightly spread apart as the ball 20 is pushed between the two prongs 316. As the seat plug 312 continues to push downwardly, the curved inner surface 639 of the base 638 of the standing valve 622 will engage the outer surfaces of the tapered distal ends 318 of the prongs 316 and push the prongs 316 inwardly back toward each other, thereby causing the ball 20 to be lifted and to be held between the two prongs 316. With the ball 20 lifted and held between the two prongs 316, the fluid that is to be drained may pass downwardly through the channel of the body 314 of the seat plug 312, through the channels 628 of the body portion 624 of the standing valve 622, through the ports 631 of the channels 628, into the interior of the body portion 624, around and underneath the ball 20, through the base 638 of the standing valve 622 and back down into the well formation. There may be some fluid that passes downwardly through the slots 626 and through the ports 631 of the slots 626, but the majority of the fluid will drain through the ports 631 of the channels 628, rather than the ports 631 of the slots 626.

The stem 632 of the standing valve 622 may have an annular ridge 634 formed on its northern end, wherein the top surface 636 of the northern end of the stem 632 is slightly concave. The curvature of the top surface 636 of the northern end of the stem 632 may correspond to the curvature of the ball 805 (see FIGS. 1A-1B) of the traveling valve 804. This allows for more surface area of the top surface 636 of the stem 632 to come in contact with the ball 805 of the traveling valve 804, thereby causing less damage to the ball 805 of the traveling valve 804. When the traveling valve 804 is lowered, the prongs 316 of the seat plug 312 slide into the slots 626 of the standing valve 622, and the stem 632 will contact the ball 805 of the traveling valve 804 and push it up off of its seat, thereby opening the traveling valve 804 and allowing pumped fluid to flow downwardly from the pump tubing, down through the traveling valve 804, through the standing valve 622, and down into the well formation.

In one embodiment of the present invention, the stem 632 may have a channel formed therethrough. This channel would allow for more flow area through the body portion 624 of the standing valve 622. This additional flow area may help to reduce the movement of the ball 20 within the interior of the body portion 624, thus lessening the wear and tear of the standing valve 622.

Figure 40:
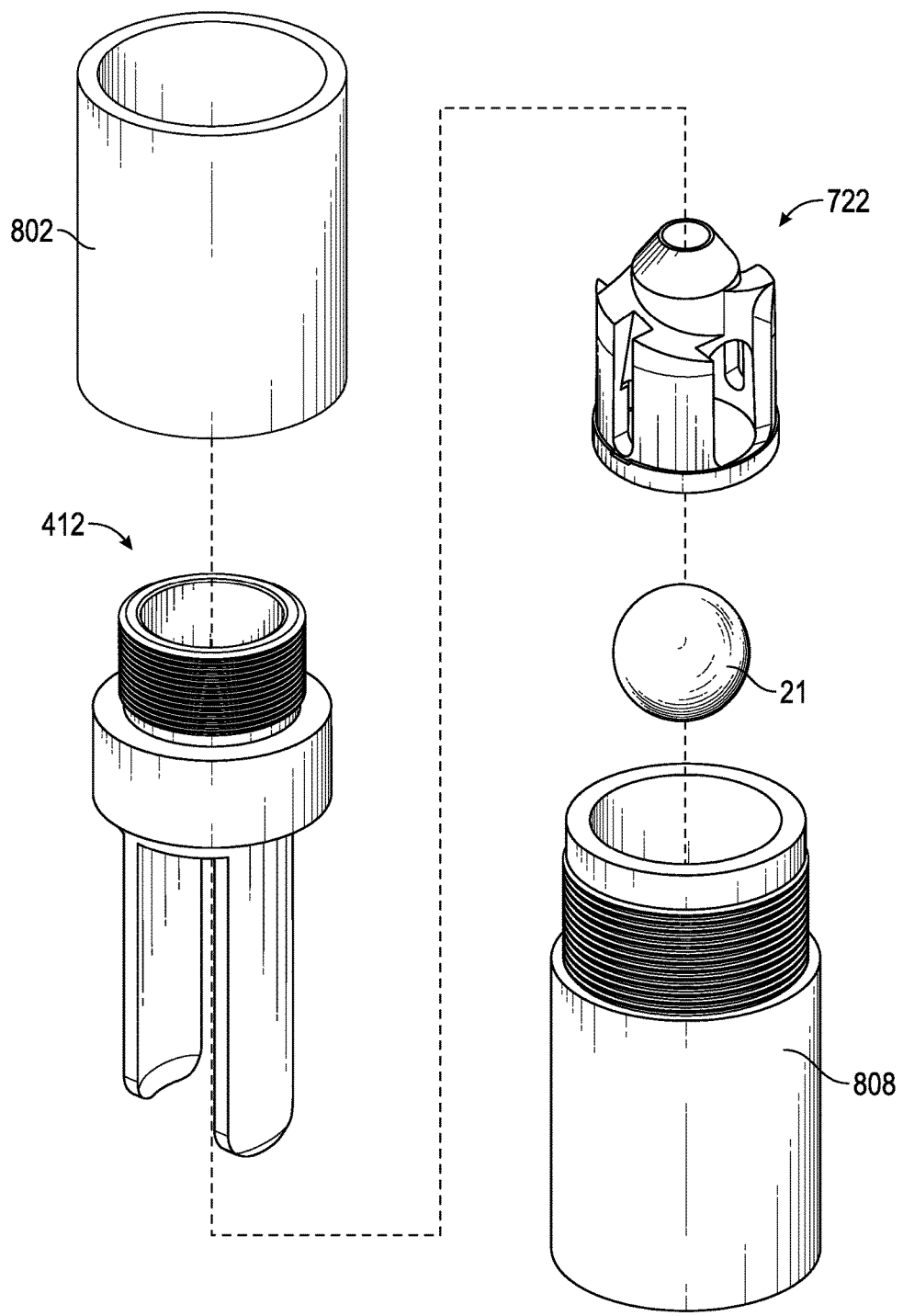
FIG. 40 is perspective exploded view of another embodiment of the dump valve assembly, in accordance with one or more aspects of the present invention.
Figure 41:
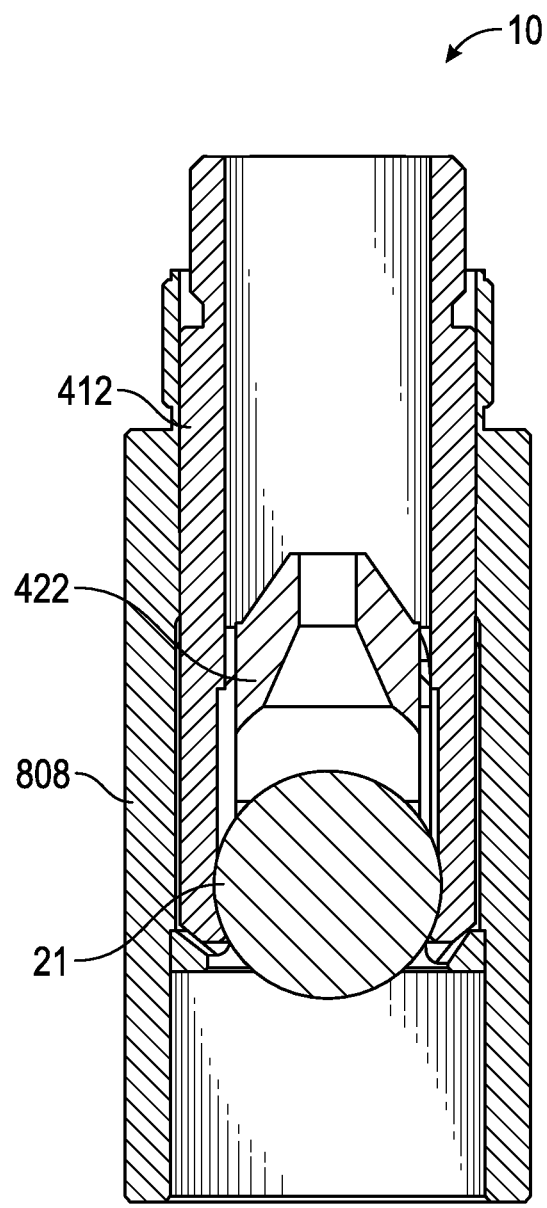
FIG. 41 is a perspective cross-sectional view of the dump valve assembly of FIG. 40
Figure 44:
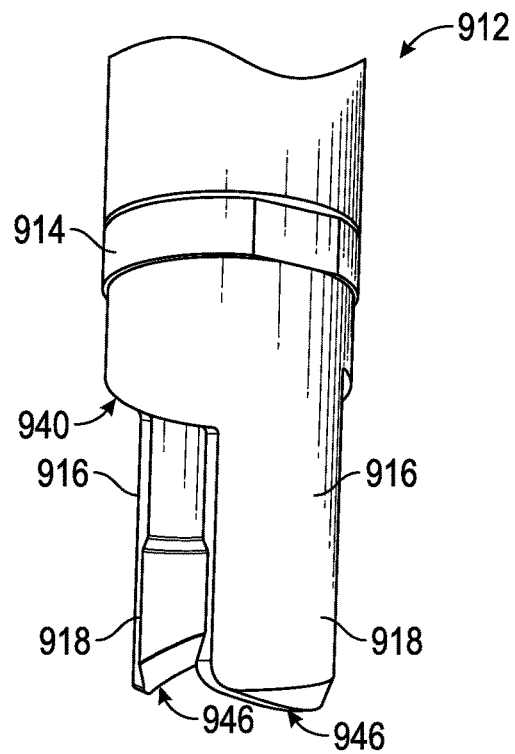
FIG. 44 side perspective view of the seat plug of FIG. 42.
Figure 45:
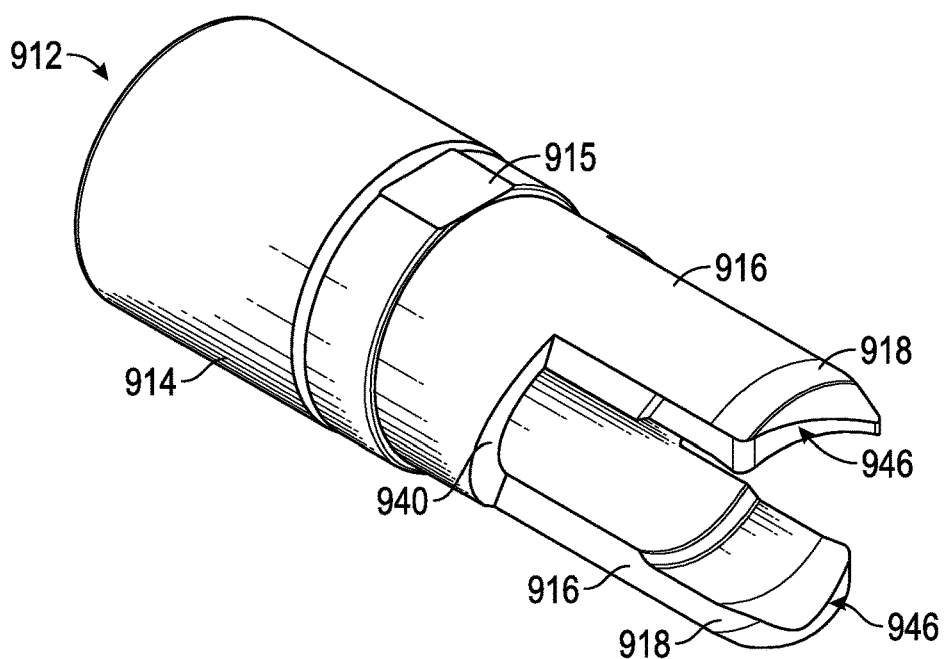
FIG. 45 is a bottom perspective view of the seat plug of FIG. 42.

FIGS. 40-41 show another embodiment of the dump valve assembly 10 of the present invention. In this embodiment, the seat plug 412 (referred to generically as seat plug 12) is adapted to mate with the standing valve 722 (referred to generically as standing valve 22) and a ball 21 is positioned within the standing valve 722, but the seat plug 412, the standing valve 722, and the ball 21 are all smaller than the other embodiments described above so that the standing valve 722 may be inserted into a standing valve cage 808 prior to being inserted into the pump barrel 802. In this embodiment, the seat plug 412 may be shaped exactly the same as the seat plug 312 shown in FIGS. 27-30, only proportionately smaller than seat plug 312. Similarly, the standing valve 722 may be shaped exactly the same as the standing valve 522 shown in FIGS. 31-34, only proportionately smaller than standing valve 522. Once the standing valve 722 has been inserted into the standing valve cage 808, the standing valve cage 808, which may have a threaded northern end, may be coupled to a southern end of the pump barrel 802. This differs from the other embodiments of the dump valve assembly 10 shown in FIGS. 1-39 in that the other embodiments have standing valves 22 that are placed directly within the pump barrel 802; i.e. no standing valve cage 808 is needed.

FIGS. 42-45 and 49 show another embodiment of the seat plug 912 (referred to generically as seat plug 12) of the present invention. This seat plug 912 may be adapted to mate with the embodiment of the standing valve 922 shown in FIGS. 46-48 (discussed below). In this embodiment, the seat plug 912 may have a cylindrical body 914 with a channel formed therethrough. The body 914 may have a first section 914a and a second section 914b, wherein the first section 914a may have a slightly larger outer diameter than the second section 914b. It should also be clearly understood, however, that the first section 914a may have the same outer diameter than the second section 914b. An interior surface of the first section 914a may have threading in order to couple it to the threaded southern end of a traveling valve 804 (see FIG. 49). The second section 914b may also have wrench flats 915 formed on its outer surface. The second section 914b may have angled bottom edges 940 so that the seat plug 912 will mate with the corresponding standing valve 922 (discussed below). The body 914 may have two prongs 916 positioned opposite from each other and extending downwardly from a southern end of the body 914. It should be clearly understood, however, that any number of prongs 916 may be used. In this embodiment, the prongs 916 may also be positioned parallel to each other and may extend downwardly and perpendicularly from the southern end of the body 914. Alternatively, the prongs 916 may be slightly angled so that the southern ends of the prongs 916 are closer together than the northern ends of the prongs 916. In other words, the distance between the northern ends of the two prongs 916 may be equal to or slightly greater than the diameter of the ball 20 while the distance between the southern ends of the two prongs 916 may be smaller than the diameter of the ball 20. For example, if the ball 20 has a diameter of 2.5 inches, then the space between the inner surfaces of the northern ends of the two prongs 916 may also be 2.5 inches or it may be 2.5 inches plus between 0.015-0.020 inches while the space between the inner surfaces of the southern ends of the two prongs 916 may be 2.5 inches minus between 0.015-0.020 inches. Of course, the distance between the two prongs 916 depends upon the size of the ball 20 within the standing valve 922 that the seat plug 912 is mating with. Each of the prongs 916 may be curved on their inner surfaces in order to correspond to the curvature of the ball 20 that is housed within the corresponding standing valve 922. The prongs 916 may be positioned a predetermined distance apart; e.g. the space between the inner surfaces of the prongs 916 may be smaller than the diameter of the ball 20.

The prongs 916 of the seat plug 912 may each have a tapered distal end 918. The tapered distal ends 918 may each be tapered on its inner surface so that the space between the inner surfaces of the tapered distal ends 918 is slightly greater than the space between the inner surfaces of the prongs 916 in the area above the tapered distal ends 918. The space between the inner surfaces of the tapered distal ends 918, however, may still be smaller than the diameter of the ball 20. In furtherance of the example above, if the space between the inner surfaces of the southern ends of the two prongs 916 above the tapered distal ends 918 is 2.5 inches minus between 0.015-0.020 inches, then the space between the inner surfaces of the two tapered distal ends 918 of the prongs 916 may be approximately $\frac{1}{16}$ inch greater. This allows the tapered distal ends 918 of the prongs 916 to fit around a top portion of the ball 20, which helps to guide the ball 20 into the space between the prongs 916 as the seat plug 912 is pushed downwardly onto the ball 20 during the drainage process. Each of the tapered distal ends 918 of the prongs 916 may also be tapered on its outer surface in order to correspond to the curved interior surface 939 of the base 938 of the standing valve 922 (discussed and shown in FIG. 46 and FIG. 47 below).

The prongs 916 of the seat plug 912 may each have a distal end 918 with an angled bottom edge 946. In other words, for each prong 916, one side 948 is longer than the other side 948. The angled bottom edge 946 of each distal end 918 of each prong 916 may have an angle of at least 30°. The bottom edges 946 are angled in this manner so that the prongs 916 of the seat plug 912 will easily align with the helical groove 944 of the corresponding standing valve 922 (discussed below).

Figure 46:
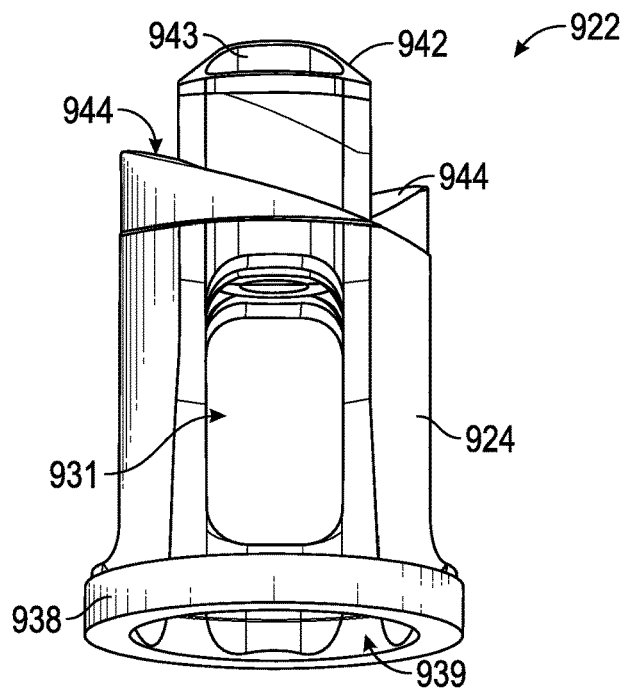
FIG. 46 is a side perspective view of another embodiment of the standing valve of another embodiment of the dump valve assembly, in accordance with one or more aspects of the present invention.
Figure 47:
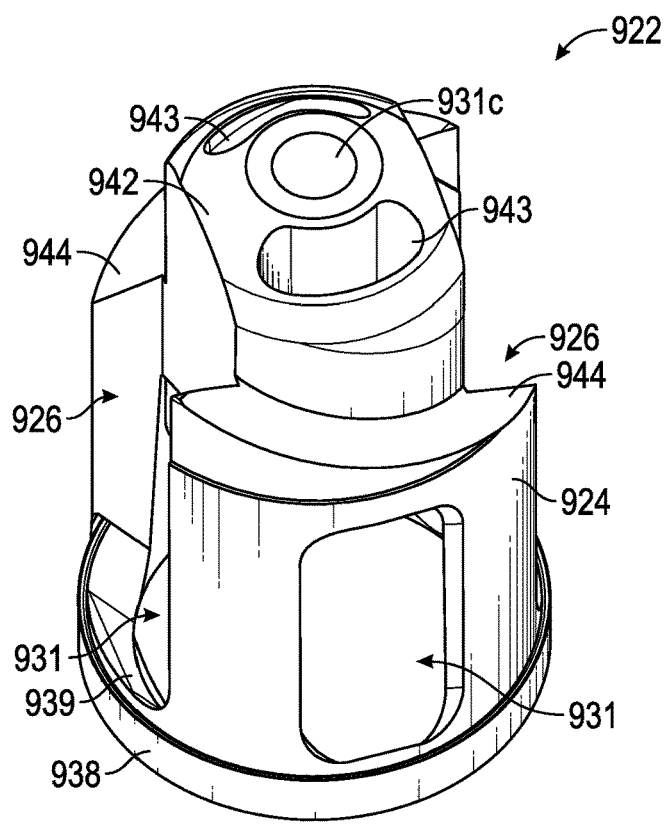
FIG. 47 is a top perspective view of the standing valve of FIG. 46.

FIGS. 46-48 show another embodiment of the standing valve 922 (referred to generically as standing valve 22) of the present invention. The standing valve 922 may have a body portion 924 and an annular base 938 coupled to the southern end of the body portion 924. This embodiment of the standing valve 922 does not have a stem.

The body portion 924 of the standing valve 922 may have two opposing slots 926 (see FIG. 47) formed along a portion of the length of the body portion 924. The two opposing slots 926 are dimensioned to receive the two prongs 916 of the seat plug 912; i.e. the two prongs 916 of the seat plug 912 may slide downwardly into the two slots 926 and may slide upwardly out of the two slots 926. The number of slots 926 may equal the number of prongs 916 of the corresponding seat plug 912.

The body portion 924 of the standing valve 922 may also have a frustoconical top 942 at its northern end and a helical groove 944. The helical groove 944 may be formed within a northern part of the body portion 924 of the standing valve 922 and may spiral downwardly along the length of the body portion 924 from the frustoconical top 942 to a point positioned above one of the slots 926 (see FIG. 47). The angle at which the helical groove 944 spirals downwardly may be at least 30°. Preferably, the angle at which the helical groove 944 spirals downwardly will be the same as or similar to the angle of the angled bottom edge 946 of each distal end 918 of each prong 916 of the seat plug 912.

In this embodiment, the standing valve 922 may have four ports 931 located proximate the southern end of the body portion 924. Each slot 926 has one port 931 (see FIG. 47) formed therein and there are two additional ports 931 that are positioned opposite from each other. Each of the additional ports 931 is positioned between two slots 926. The ports 931 all lead to the interior of the body portion 924 of the standing valve 922 (see FIG. 47). The standing valve 922 may also have a center port 931c (see FIGS. 47-48) located within the interior of the body portion 924 and positioned at a center of the frustoconical top 942 at the northern end of the body portion 924. The center port 931c also leads to the interior of the body portion 924. The standing valve 922 may also have two additional ports 943 located at the frustoconical top 942 of the body portion 924. The two additional ports 943 are preferably positioned opposite from each other with the center port 931c positioned between them. These additional ports 943 within the frustoconical top 942 allow for greater fluid passage through the standing valve 922 when the ball 20 has been captured between the two prongs 916.

During the upstroke of the pump assembly 806, formation pressure causes the ball 20 within the standing valve 922 to unseat and move upward, allowing the pumped fluid (e.g. oil) to pass through the standing valve 922 and up into the pump barrel 802 of the pump system 800. With this embodiment, the pumped fluid may pass through the annular base 938 of the standing valve 922, into interior of the body portion 924, and around the unseated ball 20. The pumped fluid may then exit the body portion 924 by flowing out of the ports 931. Pumped fluid may travel around the lower part of the unseated ball 20 and may exit the body portion 924 through the ports 931. Pumped fluid may also travel around the upper part of the unseated ball 20 and may exit the body portion 924 through the center port 931c and the two additional ports 943. The flow of the pumped fluid creates a hydraulic cushion around the unseated ball 20 within the interior of the body portion 924 which prevents the unseated ball 20 from moving too much within the interior of the body portion 924, thereby minimizing wear and tear of the standing valve 922.

After the pumping operations have ceased, the ball 20 will fall back down and seat itself, thereby closing the standing valve 922. If it is desired to drain the pump tubing, the ball 20 within the standing valve 922 must be moved in order to open the standing valve 922 and allow the drainage to occur. The prongs 916 of the seat plug 912 may be lowered and slid into the corresponding slots 926 of the standing valve 922. If the prongs 916 of the seat plug 912 do not properly align with the corresponding slots 926, the angled bottom edges 946 of the prongs 916 may contact and slide downwardly and helically along the angled helical groove 944 formed on the body portion 924 of the standing valve 922. The helical groove 944, therefore, helps to guide the prongs 916 of the seat plug 912 into the corresponding slots 926 of the standing valve 922. The inner surfaces of the tapered distal ends 918 of the prongs 916 will then begin to engage the top portion of the ball 20. The base 938 of the standing valve 922 may also have a curved inner surface 939 that is dimensioned to correspond with the outer surface of the tapered distal ends 918 of the prongs 916 of the seat plug 912. The entire inner surface 939 of the base 938 of the standing valve 922 may be curved, or substantial benefit may still be derived if only some portions of the inner surface 939 of the base 938 were curved (particularly, the areas of the base 938 that are directly beneath the slots 926). Thus, as the seat plug 912 is pushed downwardly, the prongs 916 will slightly spread apart as the ball 20 is pushed between the two prongs 916. As the seat plug 912 continues to push downwardly, the curved inner surface 939 of the base 938 of the standing valve 922 will engage the outer surfaces of the tapered distal ends 918 of the prongs 916 and push the prongs 916 inwardly back toward each other, thereby causing the ball 20 to be lifted and to be held between the two prongs 916. With the ball 20 lifted and held between the two prongs 916, the fluid that is to be drained may pass downwardly through the channel of the body 914 of the seat plug 912, through the ports 931 between the slots 926, into the interior of the body portion 924, around and underneath the ball 20, through the base 938 of the standing valve 922 and back down into the well formation. There may be some fluid that passes downwardly through center port 931c, through the additional ports 943, and/or the slots 926 and through the ports 931 of the slots 926, but the majority of the fluid will drain through the ports 931 between the slots 926, rather than the ports 931 of the slots 926.

The foregoing description is illustrative of particular embodiments of the application, but is not meant to be limitation upon the practice thereof. While embodiments of the disclosure have been described in terms of various specific embodiments, those skilled in the art will recognize that the embodiments of the disclosure may be practiced with modifications within the spirit and scope of the claims.

What is claimed is:

1. A dump valve assembly for use with a pump system comprising:
   a seat plug adapted to be coupled to a southern end of a traveling valve, the seat plug having two prongs, each prong having an angled bottom edge;
   a standing valve having a body portion and an annular base, wherein the body portion comprises;
   two slots adapted to receive the two prongs; and at least one port for allowing pumped fluid to pass therethrough; and
a ball that is adapted to be lifted by the two prongs in order to open the standing valve.

2. The dump valve assembly of claim 1 wherein the seat plug comprises:
a cylindrical body with a channel formed therethrough; and
wherein the two prongs are positioned opposite from each other and extend downwardly from the body.

3. The dump valve assembly of claim 1 wherein each of the prongs has a northern end and a southern end and wherein a space between the northern ends of the prongs is greater than a space between the southern ends of the prongs.

4. The dump valve assembly of claim 1 wherein the prongs each have a tapered distal end.

5. The dump valve assembly of claim 4 wherein the annular base of the standing valve has a curved inner surface that is adapted to engage a curved outer surface of each of the tapered distal ends of the prongs and to push the prongs together when the seat plug is pushed downwardly over the ball within the standing valve.

6. The dump valve assembly of claim 1 wherein the angled bottom edge of each prong has an angle of at least 30°.

7. The dump valve assembly of claim 1 wherein the cylindrical body of the seat plug has an angled bottom edge.

8. The dump valve assembly of claim 1 wherein the standing valve comprises:
four ports located proximate a southern end of the body portion, wherein each slot has a port formed therein;
a center port formed at a center of the northern end of an interior of the body portion; and
two ports formed at the northern end of the interior of the body portion, wherein the two ports are located opposite from one another and wherein the center port is positioned between them.

9. The dump valve assembly of claim 1 wherein the body portion of the standing valve comprises:
a frustoconical top; and
a helical groove formed along a northern part of the body portion of the standing valve wherein the helical groove spirals downwardly along a portion of the length of the body portion.

10. The dump valve assembly of claim 9 wherein the angle at which the helical groove spirals downwardly is equal to the angle of the angled bottom edge of each prong of the seat plug.

11. The dump valve assembly of claim 9 wherein the angle at which the helical groove spirals downwardly is at least 30°.

12. The dump valve assembly of claim 1 further comprising a standing valve cage adapted to receive the standing valve therein and adapted to coupled to a southern end of a pump barrel.

13. A dump valve assembly for use with a pump system comprising:
a seat plug, the seat plug comprising:
a body adapted to be coupled to a southern end of a traveling valve; and
at least two prongs extending downwardly from the body of the seat plug, and each prong having an angled bottom edge;
a standing valve having a body portion and an annular base, wherein the body portion comprises:
at least two slots adapted to receive the at least two prongs; and
at least four ports located proximate a southern end of the body portion, wherein each slot has a port formed therein and wherein the ports allow pumped fluid to pass upwardly therethrough during an upstroke of pump system and also downwardly during a draining of the pump system;
a center port formed at a center of the northern end of an interior of the body portion; and
two ports formed at the northern end of the interior of the body portion, wherein the two ports are located opposite from one another and wherein the center port is positioned between them; and
a ball that is adapted to be lifted by the at least two prongs in order to open the standing valve during the draining of the pump system.

14. The dump valve assembly of claim 13 wherein each of the prongs has a northern end and a southern end and wherein a space between the northern ends of the prongs is greater than a space between the southern ends of the prongs.

15. The dump valve assembly of claim 13 wherein the prongs each have a tapered distal end.

16. The dump valve assembly of claim 13 wherein the annular base of the standing valve has a curved inner surface that is adapted to engage a curved outer surface of each of the tapered distal ends of the prongs and to push the prongs together when the seat plug is pushed downwardly over the ball within the standing valve.

17. The dump valve assembly of claim 13 wherein the angled bottom edge of each prong has an angle of at least 30°.

18. The dump valve assembly of claim 17 wherein the body portion of the standing valve comprises:
a frustoconical top; and
a helical groove formed along a northern part of the body portion of the standing valve wherein the helical groove spirals downwardly along a portion of the length of the body portion and wherein the angle at which the helical groove spirals downwardly is at least 30°.

19. The dump valve assembly of claim 13 wherein the cylindrical body of the seat plug has an angled bottom edge.

20. A method for draining a pump system comprising the steps of:
providing a dump valve assembly, wherein the dump valve assembly comprises:
a seat plug adapted to be coupled to a southern end of a traveling valve, the seat plug having two prongs, each prong having an angled bottom edge;
a standing valve having a body portion and an annular base, wherein the body portion comprises;
two slots adapted to receive the two prongs; and
four ports located proximate a southern end of the body portion, wherein each slot has a port formed therein and wherein the ports allow pumped fluid to pass upwardly therethrough during an upstroke of pump system and also downwardly during a draining of the pump system; and
a ball positioned within the standing valve;
pressing the traveling valve downwardly;
inserting the two prongs of the seat plug into the two slots of the standing valve;
capturing the ball between the two prongs;
lifting the traveling valve upwardly in order to unseat the ball and to open the standing valve; and draining pumped fluid downwardly through the ports within the body portion of the standing valve.

* * * * *